US011922968B2

(12) United States Patent
Stojancic et al.

(10) Patent No.: US 11,922,968 B2
(45) **Date of Patent: *Mar. 5, 2024**

(54) AUDIO PROCESSING FOR DETECTING OCCURRENCES OF LOUD SOUND CHARACTERIZED BY BRIEF AUDIO BURSTS

(71) Applicant: STATS LLC, Chicago, IL (US)

(72) Inventors: Mihailo Stojancic, San Jose, CA (US); Warren Packard, Palo Alto, CA (US)

(73) Assignee: STATS LLC, Chicago, IL (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/681,115

(22) Filed: Feb. 25, 2022

(65) Prior Publication Data

US 2022/0180892 A1 Jun. 9, 2022

Related U.S. Application Data

(63) Continuation of application No. 16/553,025, filed on Aug. 27, 2019, now Pat. No. 11,264,048, which is a (Continued)

(51) Int. Cl.
*G10L 25/51* (2013.01)
*G10L 21/0232* (2013.01)

(Continued)

(52) U.S. Cl.
CPC .......... *G10L 25/51* (2013.01); *G10L 21/0232* (2013.01); *G10L 21/14* (2013.01); *G10L 25/18* (2013.01)

(58) Field of Classification Search
None
See application file for complete search history.

(56) References Cited

U.S. PATENT DOCUMENTS 5,177,931 A 1/1993 Latter et al.
5,681,396 A 10/1997 Madanshetty et al.

(Continued)

FOREIGN PATENT DOCUMENTS

CN 101650722 10/2011
CN 105912560 8/2016

(Continued)

OTHER PUBLICATIONS

US 10,462,538 B2, 10/2019, Packard et al. (withdrawn)

(Continued)

*Primary Examiner* — Walter F Briney, III
(74) *Attorney, Agent, or Firm* — Bookoff McAndrews, PLLC

(57) ABSTRACT

A boundary of a highlight of audiovisual content depicting an event is identified. The audiovisual content may be a broadcast, such as a television broadcast of a sporting event. The highlight may be a segment of the audiovisual content deemed to be of particular interest. Audio data for the audiovisual content is stored, and the audio data is automatically analyzed to detect one or more audio events indicative of one or more occurrences to be included in the highlight. Each audio event may be a brief, high-energy audio burst such as the sound made by a tennis serve. A time index within the audiovisual content, before or after the audio event, may be designated as the boundary, which may be the beginning or end of the highlight.

17 Claims, 11 Drawing Sheets

Related U.S. Application Data continuation-in-part of application No. 16/440,229, filed on Jun. 13, 2019, now abandoned, and a continuation-in-part of application No. 16/421,391, filed on May 23, 2019, now Pat. No. 11,025,985.

(60) Provisional application No. 62/746,454, filed on Oct. 16, 2018, provisional application No. 62/712,041, filed on Jul. 30, 2018, provisional application No. 62/680,955, filed on Jun. 5, 2018.

(51) Int. Cl.
*G10L 21/14* (2013.01)
*G10L 25/18* (2013.01)

(56) References Cited

U.S. PATENT DOCUMENTS 5,954,611 A 9/1999 Mills et al.
6,005,562 A 12/1999 Shiga et al.
6,185,527 B1 2/2001 Petkovic et al.
6,195,458 B1 2/2001 VVarnick et al.
6,452,875 B1 9/2002 Lee et al.
6,557,042 B1 4/2003 He et al.
6,721,490 B1 4/2004 Yao et al.
7,174,512 B2 2/2007 Martin et al.
7,197,715 B1 3/2007 Valeria
7,386,217 B2 6/2008 Zhang
7,543,322 B1 6/2009 Bhogal et al.
7,633,887 B2 12/2009 Panwar et al.
7,646,962 B1 1/2010 Ellis et al.
7,680,894 B2 3/2010 Diot et al.
7,742,111 B2 6/2010 Shiu et al.
7,774,811 B2 8/2010 Poslinski et al.
7,818,368 B2 10/2010 Yang et al.
7,825,989 B1 11/2010 Greenberg
7,831,112 B2 11/2010 Wang et al.
7,849,487 B1 12/2010 Vosseller
7,929,808 B2 4/2011 Seaman et al.
8,024,753 B1 9/2011 Kummer et al.
8,046,798 B1 10/2011 Schlack et al.
8,079,052 B2 12/2011 Chen et al.
8,099,315 B2 1/2012 Amento et al.
8,104,065 B2 1/2012 Aaby et al.
8,140,570 B2 3/2012 Ingrassia et al.
8,196,168 B1 6/2012 Bryan et al.
8,209,713 B1 6/2012 Lai et al.
8,296,797 B2 10/2012 Dlstad et al.
8,296,808 B2 10/2012 Hardacker et al.
8,312,486 B1 11/2012 Briggs et al.
8,320,674 B2 11/2012 Guillou et al.
8,424,041 B2 4/2013 Candelore et al.
8,427,356 B1 4/2013 Satish
8,457,768 B2 6/2013 Hammer et al.
8,535,131 B2 9/2013 Packard et al.
8,595,763 B1 11/2013 Packard et al.
8,627,349 B2 1/2014 Kirby et al.
8,688,434 B1 4/2014 Birnbaum et al.
8,689,258 B2 4/2014 Kemo
8,702,504 B1 4/2014 Hughes et al.
8,713,008 B2 4/2014 Negi
8,752,084 B1 6/2014 Lai et al.
8,793,579 B2 7/2014 Halliday et al.
8,923,607 B1 12/2014 Kwatra et al.
8,966,513 B2 2/2015 John et al.
8,973,038 B2 3/2015 Gratton
8,973,068 B2 3/2015 Kotecha et al.
8,990,418 B1 3/2015 Bragg et al.
9,038,127 B2 5/2015 Hastings et al.
9,060,210 B2 6/2015 Packard et al.
9,066,156 B2 6/2015 Kapa
9,213,986 B1 12/2015 Buchheit et al.
9,251,853 B2 2/2016 Jeong et al.
9,253,533 B1 2/2016 Morgan et al.
9,264,779 B2 2/2016 Kirby et al.
9,299,364 B1 3/2016 Pereira et al.
9,390,719 B1 7/2016 Roblek et al.
9,420,333 B2 8/2016 Martch et al.
9,451,202 B2 9/2016 Beals
9,565,474 B2 2/2017 Petruzzelli et al.
9,578,377 B1 2/2017 Malik et al.
9,583,149 B2 2/2017 Stieglitz
9,648,379 B2 5/2017 Howcroft
9,715,902 B2 7/2017 Coviello et al.
9,788,062 B2 10/2017 Dimov et al.
10,014,008 B2 7/2018 Cho et al.
10,056,116 B2 8/2018 Packard et al.
10,297,287 B2 5/2019 Maisenbacher et al.
10,419,830 B2 9/2019 Packard et al.
10,433,030 B2 10/2019 Packard et al.
11,264,048 B1 * 3/2022 Stojancic ................ G10L 25/51
2001/0013123 A1 8/2001 Freeman et al.
2001/0026609 A1 10/2001 Weinstein et al.
2002/0041752 A1 4/2002 Abiko et al.
2002/0059610 A1 5/2002 Ellis
2002/0067376 A1 6/2002 Martin et al.
2002/0075402 A1 6/2002 Robson et al.
2002/0136528 A1 9/2002 Dagtas
2002/0157095 A1 10/2002 Masumitsu et al.
2002/0157101 A1 10/2002 Schrader et al.
2002/0174430 A1 11/2002 Ellis et al.
2002/0178444 A1 11/2002 Trajkovic et al.
2002/0180774 A1 12/2002 Errico et al.
2002/0194095 A1 12/2002 Koren
2003/0012554 A1 1/2003 Zeidler et al.
2003/0023742 A1 1/2003 Allen et al.
2003/0056220 A1 3/2003 Thornton et al.
2003/0063798 A1 4/2003 Li et al.
2003/0066077 A1 4/2003 Gutta
2003/0118014 A1 6/2003 Iyer et al.
2003/0126605 A1 7/2003 Betz et al.
2003/0126606 A1 7/2003 Buczak et al.
2003/0154475 A1 8/2003 Rodriguez et al.
2003/0172376 A1 9/2003 Coffin
2003/0188317 A1 10/2003 Liew et al.
2003/0189674 A1 10/2003 Inoue et al.
2003/0208763 A1 11/2003 McElhatten et al.
2003/0229899 A1 12/2003 Thompson et al.
2004/0003403 A1 1/2004 Marsh
2004/0041831 A1 3/2004 Zhang
2004/0167767 A1 * 8/2004 Xiong ..................... G10L 25/00 704/E11.001
2004/0181807 A1 9/2004 Theiste et al.
2005/0005308 A1 1/2005 Logan et al.
2005/0015712 A1 1/2005 Plastina
2005/0030977 A1 2/2005 Casey et al.
2005/0044570 A1 2/2005 Poslinski
2005/0071865 A1 3/2005 Martins
2005/0071881 A1 3/2005 Deshpande
2005/0091690 A1 4/2005 Delpuch et al.
2005/0120368 A1 6/2005 Goronzy et al.
2005/0125302 A1 6/2005 Brown et al.
2005/0149965 A1 7/2005 Neogi
2005/0152565 A1 7/2005 Jouppi et al.
2005/0154987 A1 7/2005 Otsuka et al.
2005/0166230 A1 7/2005 Gaydou et al.
2005/0180568 A1 8/2005 Krause
2005/0182792 A1 8/2005 Israel et al.
2005/0191041 A1 9/2005 Braun et al.
2005/0198570 A1 9/2005 Otsuka et al.
2005/0204294 A1 9/2005 Burke
2005/0240961 A1 10/2005 Jerding et al.
2005/0264705 A1 12/2005 Kitamura
2006/0020962 A1 1/2006 Stark et al.
2006/0085828 A1 4/2006 Dureau et al.
2006/0174277 A1 8/2006 Sezan et al.
2006/0190615 A1 8/2006 Panwar et al.
2006/0218573 A1 9/2006 Proebstel
2006/0238656 A1 10/2006 Chen et al.
2006/0253581 A1 11/2006 Dixon et al.
2006/0282852 A1 12/2006 Purpura et al.
2006/0282869 A1 12/2006 Plourde
2007/0033616 A1 2/2007 Gutta
2007/0058930 A1 3/2007 Iwamoto

(56) References Cited

U.S. PATENT DOCUMENTS

2007/0083901 A1 4/2007 Bond
2007/0127894 A1 6/2007 Ando et al.
2007/0146554 A1 6/2007 Strickland et al.
2007/0154163 A1 7/2007 Cordray
2007/0154169 A1 7/2007 Cordray et al.
2007/0157235 A1 7/2007 Teunissen
2007/0157249 A1 7/2007 Cordray et al.
2007/0157253 A1 7/2007 Ellis et al.
2007/0157285 A1 7/2007 Frank et al.
2007/0162924 A1 7/2007 Radhakrishnan et al.
2007/0169165 A1 7/2007 Crull et al.
2007/0188655 A1 8/2007 Dhta
2007/0199040 A1 8/2007 Kates
2007/0204302 A1 8/2007 Calzone
2007/0212023 A1 9/2007 Whitlock
2007/0226766 A1 9/2007 Poslinski et al.
2007/0239856 A1 10/2007 Abadir
2007/0245379 A1 10/2007 Agnihortri
2007/0250777 A1 10/2007 Chen et al.
2007/0288951 A1 12/2007 Ray et al.
2008/0022012 A1 1/2008 Wang
2008/0060006 A1 3/2008 Shanks et al.
2008/0064490 A1 3/2008 Ellis
2008/0086743 A1 4/2008 Cheng et al.
2008/0092168 A1 4/2008 Logan et al.
2008/0097949 A1 4/2008 Kelly et al.
2008/0109307 A1 5/2008 Ullah
2008/0115166 A1 5/2008 Bhogal et al.
2008/0134043 A1 6/2008 Georgis et al.
2008/0155602 A1 6/2008 Collet et al.
2008/0159708 A1 7/2008 Kazama et al.
2008/0163305 A1 7/2008 Johnson et al.
2008/0168503 A1 7/2008 Sparrell
2008/0178219 A1 7/2008 Grannan
2008/0193016 A1 8/2008 Lim et al.
2008/0195385 A1* 8/2008 Pereg ...................... G10L 17/26
704/E15.001
2008/0195457 A1 8/2008 Sherman et al.
2008/0235348 A1 9/2008 Dasgupta
2008/0239169 A1 10/2008 Moon et al.
2008/0244666 A1 10/2008 Moon et al.
2008/0270038 A1 10/2008 Partovi et al.
2008/0271078 A1 10/2008 Gossweiler et al.
2008/0300982 A1 12/2008 Larson et al.
2008/0307485 A1 12/2008 Clement et al.
2008/0320523 A1 12/2008 Morris et al.
2009/0025027 A1 1/2009 Craner
2009/0034932 A1 2/2009 Disel
2009/0055385 A1 2/2009 Jean et al.
2009/0080857 A1 3/2009 St. John-Larkin
2009/0082110 A1 3/2009 Relyea et al.
2009/0102984 A1 4/2009 Mina et al.
2009/0138902 A1 5/2009 Kamen
2009/0144777 A1 6/2009 Mikami et al.
2009/0157391 A1 6/2009 Bilobrov
2009/0158357 A1 6/2009 Miller
2009/0178071 A1 7/2009 Whitehead
2009/0210898 A1 8/2009 Childress et al.
2009/0228911 A1 9/2009 Vriisen
2009/0234828 A1 9/2009 Tu
2009/0235313 A1 9/2009 Maruyama et al.
2009/0249412 A1 10/2009 Bhoga et al.
2009/0293093 A1 11/2009 Igarashi
2009/0299824 A1 12/2009 Barnes
2009/0325523 A1 12/2009 Choi
2010/0040151 A1 2/2010 Garrett
2010/0064306 A1 3/2010 Tiongson et al.
2010/0071007 A1 3/2010 Meijer
2010/0071062 A1 3/2010 Choyi et al.
2010/0086277 A1 4/2010 Craner
2010/0089996 A1 4/2010 Koolar
2010/0115554 A1 5/2010 Drouet et al.
2010/0122294 A1 5/2010 Craner
2010/0123830 A1 5/2010 Vunic
2010/0125864 A1 5/2010 Dwyer et al.
2010/0146560 A1 6/2010 Bonfrer
2010/0153856 A1 6/2010 Russ
2010/0153983 A1 6/2010 Phillmon et al.
2010/0153999 A1 6/2010 Yates
2010/0158479 A1 6/2010 Craner
2010/0166389 A1 7/2010 Knee et al.
2010/0169925 A1 7/2010 Takegoshi
2010/0218214 A1 8/2010 Fan et al.
2010/0251295 A1 9/2010 Amento et al.
2010/0251304 A1 9/2010 Donoghue et al.
2010/0251305 A1 9/2010 Kimble et al.
2010/0262986 A1 10/2010 Adimatvam et al.
2010/0269144 A1 10/2010 Forsman et al.
2010/0319019 A1 12/2010 Zazza
2010/0322592 A1 12/2010 Casagrande
2010/0333131 A1 12/2010 Parker et al.
2011/0016492 A1 1/2011 Marita
2011/0016493 A1 1/2011 Lee et al.
2011/0019839 A1 1/2011 Nandury
2011/0052156 A1 3/2011 Kuhn
2011/0072448 A1 3/2011 Stiers et al.
2011/0075851 A1 3/2011 LeBoeuf et al.
2011/0082858 A1 4/2011 Yu et al.
2011/0109801 A1 5/2011 Thomas et al.
2011/0161242 A1 6/2011 Chung et al.
2011/0173337 A1 7/2011 Walsh et al.
2011/0202956 A1 8/2011 Connelly et al.
2011/0206342 A1 8/2011 Thompson et al.
2011/0212756 A1 9/2011 Packard et al.
2011/0217024 A1 9/2011 Schlieski et al.
2011/0231887 A1 9/2011 West
2011/0239249 A1 9/2011 Munson et al.
2011/0243533 A1 10/2011 Stern et al.
2011/0252451 A1 10/2011 Turgeman et al.
2011/0286721 A1 11/2011 Craner
2011/0289410 A1 11/2011 Paczkowski et al.
2011/0293113 A1 12/2011 McCarthy
2012/0020641 A1 1/2012 Sakaniwa et al.
2012/0047542 A1 2/2012 Lewis et al.
2012/0052941 A1 3/2012 Mo
2012/0060178 A1 3/2012 Minakuchi et al.
2012/0082431 A1 4/2012 Sengupta et al.
2012/0106932 A1 5/2012 Grevers, Jr.
2012/0110615 A1 5/2012 Kilar et al.
2012/0110616 A1 5/2012 Kilar et al.
2012/0124625 A1 5/2012 Foote et al.
2012/0131613 A1 5/2012 Ellis et al.
2012/0185895 A1 7/2012 Wong et al.
2012/0204209 A1 8/2012 Kuba
2012/0216118 A1 8/2012 Lin et al.
2012/0230651 A1 9/2012 Chen
2012/0237182 A1 9/2012 Eyer
2012/0246672 A1 9/2012 Sridhar et al.
2012/0260295 A1 10/2012 Rondeau
2012/0263439 A1 10/2012 Lassman et al.
2012/0278834 A1 11/2012 Richardson
2012/0278837 A1 11/2012 Gurtis et al.
2012/0284745 A1 11/2012 Strange
2012/0311633 A1 12/2012 Mandrekar et al.
2012/0324491 A1 12/2012 Bathiche et al.
2013/0014159 A1 1/2013 Wiser et al.
2013/0042179 A1 2/2013 Cormack et al.
2013/0055304 A1 2/2013 Kirby et al.
2013/0061313 A1 3/2013 Cullimore et al.
2013/0073473 A1 3/2013 Heath
2013/0074109 A1 3/2013 Skelton et al.
2013/0114940 A1 5/2013 Merzon et al.
2013/0128119 A1 5/2013 Madathodiyil et al.
2013/0138435 A1 5/2013 Weber
2013/0138693 A1 5/2013 Sathish et al.
2013/0145023 A1 6/2013 Li et al.
2013/0160051 A1 6/2013 Armstrong et al.
2013/0174196 A1 7/2013 Herlein
2013/0194503 A1 8/2013 Yamashita
2013/0226983 A1 8/2013 Reining et al.
2013/0251331 A1 9/2013 Sambongi
2013/0263189 A1 10/2013 Gamer
2013/0268620 A1 10/2013 Osminer
2013/0268955 A1 10/2013 Conrad et al.

(56) References Cited

U.S. PATENT DOCUMENTS

2013/0283162 A1 10/2013 Aronsson et al.
2013/0291037 A1 10/2013 Im et al.
2013/0298146 A1 11/2013 Conrad et al.
2013/0298151 A1 11/2013 Leske et al.
2013/0325869 A1 12/2013 Reiley et al.
2013/0326406 A1 12/2013 Reiley et al.
2013/0326575 A1 12/2013 Robillard et al.
2013/0332962 A1 12/2013 Moritz et al.
2013/0332965 A1 12/2013 Seyller et al.
2013/0346302 A1 12/2013 Purves et al.
2014/0023348 A1 1/2014 D'Kelly et al.
2014/0028917 A1 1/2014 Smith et al.
2014/0032709 A1 1/2014 Saussy et al.
2014/0062696 A1 3/2014 Packard et al.
2014/0067825 A1 3/2014 Dztaskent et al.
2014/0067828 A1 3/2014 Archibong
2014/0067939 A1 3/2014 Packard et al.
2014/0068675 A1 3/2014 Mountain
2014/0068692 A1 3/2014 Archibong et al.
2014/0074866 A1 3/2014 Shah
2014/0082670 A1 3/2014 Papish
2014/0088952 A1 3/2014 Fife et al.
2014/0114647 A1 4/2014 Allen
2014/0114966 A1 4/2014 Bilinski et al.
2014/0123160 A1 5/2014 van Coppenolle et al.
2014/0130094 A1 5/2014 Kirby et al.
2014/0139555 A1 5/2014 Levy
2014/0140680 A1 5/2014 Jo
2014/0150009 A1 5/2014 Sharma
2014/0153904 A1 6/2014 Adimatvam et al.
2014/0157327 A1 6/2014 Roberts et al.
2014/0161417 A1 6/2014 Kurupacheril et al.
2014/0215539 A1 7/2014 Chen et al.
2014/0223479 A1 8/2014 Krishnamoorthi et al.
2014/0282714 A1 9/2014 Hussain
2014/0282741 A1 9/2014 Shoykhet
2014/0282744 A1 9/2014 Hardy et al.
2014/0282745 A1 9/2014 Chipman et al.
2014/0282759 A1 9/2014 Harvey et al.
2014/0282779 A1 9/2014 Navarro
2014/0294201 A1 10/2014 Johnson et al.
2014/0298378 A1 10/2014 Kelley
2014/0310819 A1 10/2014 Cakarel et al.
2014/0313341 A1 10/2014 Stribling
2014/0321831 A1 10/2014 Olsen et al.
2014/0325556 A1 10/2014 Hoang et al.
2014/0330556 A1 11/2014 Resch et al.
2014/0331260 A1 11/2014 Gratton
2014/0333841 A1 11/2014 Steck
2014/0351045 A1 11/2014 Abihssira et al.
2014/0373079 A1 12/2014 Friedrich et al.
2015/0003814 A1 1/2015 Miller
2015/0012656 A1 1/2015 Phillips et al.
2015/0020097 A1 1/2015 Freed et al.
2015/0040176 A1 2/2015 Hybertson et al.
2015/0052568 A1 2/2015 Glennon et al.
2015/0058890 A1 2/2015 Kapa
2015/0082172 A1 3/2015 Shakib et al.
2015/0095932 A1 4/2015 Ren
2015/0110461 A1 4/2015 Maisenbacher et al.
2015/0110462 A1 4/2015 Maisenbacher et al.
2015/0118992 A1 4/2015 Wyatt et al.
2015/0181132 A1 6/2015 Kummer et al.
2015/0181279 A1 6/2015 Martch et al.
2015/0189377 A1 7/2015 Wheatley et al.
2015/0221321 A1* 8/2015 Christian ................ G10L 25/48
700/94
2015/0243326 A1 8/2015 Pacurariu et al.
2015/0249803 A1 9/2015 Tozer et al.
2015/0249864 A1 9/2015 Tang et al.
2015/0281778 A1 10/2015 Khafa et al.
2015/0310725 A1 10/2015 Koskan et al.
2015/0310894 A1 10/2015 Stieglitz
2015/0334461 A1 11/2015 Yu
2015/0358687 A1 12/2015 Kummer
2015/0358688 A1 12/2015 Kummer
2016/0066020 A1 3/2016 Mountain
2016/0066026 A1 3/2016 Mountain
2016/0066042 A1 3/2016 Dimov et al.
2016/0066049 A1 3/2016 Mountain
2016/0066056 A1 3/2016 Mountain
2016/0073172 A1 3/2016 Sharpies
2016/0088351 A1 3/2016 Petruzzelli
2016/0105708 A1 4/2016 Packard et al.
2016/0105733 A1 4/2016 Packard et al.
2016/0105734 A1 4/2016 Packard et al.
2016/0191147 A1 6/2016 Martch
2016/0198229 A1 7/2016 Keipert
2016/0309212 A1 10/2016 Martch et al.
2016/0314803 A1 10/2016 Stone et al.
2017/0032630 A1 2/2017 Gervais et al.
2017/0061969 A1* 3/2017 Thornburg .............. G10L 25/51
2018/0014072 A1 1/2018 Dimov et al.
2018/0020243 A1 1/2018 Ni et al.
2019/0205652 A1 7/2019 Ray et al.
2019/0373310 A1 12/2019 Stojancic et al.

FOREIGN PATENT DOCUMENTS

EP 1469476 10/2004
EP 1865716 12/2007
EP 2107477 10/2009
EP 2309733 4/2011
EP 2403239 1/2012
EP 2464138 6/2012
JP 10322622 12/1998
JP 2001251581 9/2001
JP 2004072540 3/2004
JP 2004260297 9/2004
JP 2005-317165 11/2005
JP 2006211311 8/2006
JP M06-245745 9/2006
JP 2006333451 12/2006
JP 2007202206 8/2007
JP 2902568 12/2007
JP 2008167019 7/2008
JP 2012-029150 2/2012
JP 5034516 9/2012
JP 2013-175854 9/2013
JP 2014-157460 8/2014
JP 2014187687 10/2014
KR 2004-0025073 3/2004
KR 2006-0128295 12/2006
KR 10-0863122 10/2008
KR 10-1128521 3/2012
WO WO-3837694 8/1998
WO WO-3243353 5/2002
WO WO-2005059807 6/2005
WO WO-2007064987 6/2007
WO WO-2007098067 8/2007
WO WO-2009073925 6/2009
WO WO-2011040999 4/2011
WO WO-2013016626 1/2013
WO WO-2013166456 11/2013
WO WO-2014072742 5/2014
WO WO-2014164782 10/2014
WO WO-2014179017 11/2014
WO WO-2016030380 3/2016
WO WO-2016030384 3/2016
WO WO-2016030477 3/2016
WO WO-2016033545 3/2016
WO WO-2016034899 3/2016
WO WO-2016055761 4/2016
WO WO-2016057416 4/2016
WO WO-2016057844 4/2016

OTHER PUBLICATIONS

Yong Rui et al., Automatically Extracting Highlights for TV Baseball Programs, Proc. of the 8th ACM Intl Conf. on Multimedia 105 (Oct. 2000) (Year: 2000).

BoxfishrTV's API; www_boxfish_com, (retrieved Mar. 28, 2017), 5 pages.

(56) References Cited

OTHER PUBLICATIONS

International Search Report for PCT/US2014/060651 dated Jan. 19, 2015 (9 pages).
International Search Report for PCT/US2014/060649 dated Jan. 8, 2015 (9 pages).
Jin, S.H., et al., "Intelligent broadcasting system and services for personalized semantic contents consumption", Expert Systems with Applications, Oxford, GB, vol. 31, No. 1, Jul. 1, 2006, pp. 164-173.
Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.
Thuuz Sports, "Frequently Asked Questions", www_thuuz_com/faq/, (retrieved Mar. 28, 2017), 5 pages.
R. Natarajan et al. "Audio-Based Event Detection in Videos—A Comprehensive Survey", Int. Journal of Engineering and Technology, vol. 6 No. 4 Aug.-Sep. 2014.
Q. Huang et al. Hierarchical Language Modeling for Audio Events Detection in a Sports Game, IEEE International conference on Acoustics, Speech and Signal Processing, 2010.
Q. Huang et al. "Inferring the Structure of a Tennis Game Using Audio Information", IEEE Trans. on Audio Speech and Language Proc., Oct. 2011.
M. Baillie et al. "Audio-based Event Detection for Sports Video", International Conference on Image and Video, CIVR 2003.
Y. Rui et al. "Automatically Extracting Highlights for TV Baseball Programs", Proceedings of the eighth ACM International conference on Multimedia, 2000.
D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.
E. Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), pp. 20-23, 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevslcy et al. "ImageNet Classification with Deep Convolutional Neural Networks", In Proc. NIPS, pp. 10971105, 2012.
J. A. Sadlier et al. "Event Detection in Field Sports Video Using Audio-Visual Features and a Support Vector Vlachine", IEEE Trans. on Circuits and Systems for Video Technology, vol. 15, No. 10, Oct. 2005.
J.F. Felzenszwalb et al. "Efficient Graph-Based Image Segmentation", International Journal of Computer Vision, Sep. 2004, vol. 59, Issue 2, pp. 167-181.
3. J. C. Burges "A Tutorial on Support Vector Machines for Pattern Recognition", Springer, Data Mining and 'Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 1700, Springer, 2012.
L. Neumann, J. Matas, "Real-Time Scene Text Localization and Recognition", 5th IEEE Conference on Computer vision and Pattern Recognition, Jun. 2012.
R. Smith "An Overview of the Tesseract OCR Engine", International Conference on Document Analysis and Recognition (ICDAR), 2007.
M. Merler, et al., "The Excitement of Sports: Automatic Highlights Using AudioNisual Cues", Dec. 31, 2017, pp. 2520-2523.
H. Harb, et al., Highlights Detection in Sports Videos Based on Audio Analysis, pp. 1-4, Sep. 2009.
J. Ye, et al. Audio-Based Sports Highlight Detection by Fourier Local-Auto-Correlations, 11th Annual Conference of the International Speech Communication Association, Sep. 2010, pp. 2198-2201.
Miyamori, Hisashi "Automatic Generation of Personalized Digest Based on Context Flow and Distinctive Events", IEICE Technical Report, Jul. 10, 2003, vol. 103, No. 209, pp. 35-40.

* cited by examiner

AUDIO PROCESSING FOR DETECTING OCCURRENCES OF LOUD SOUND CHARACTERIZED BY BRIEF AUDIO BURSTS

CROSS-REFERENCE TO RELATED APPLICATIONS

The present application is a continuation of U.S. application Ser. No. 16/553,025, filed Aug. 27, 2019, which is a continuation-in-part of U.S. application Ser. No. 16/440,229, filed Jun. 13, 2019, and a continuation-in-part of U.S. application Ser. No. 16/421,391, filed May 23, 2019. U.S. application Ser. No. 16/440,229, filed Jun. 13, 2019, claims the benefit of priority to U.S. Provisional Ser. No. 62/712,041, filed Jul. 30, 2018, and U.S. Provisional Ser. No. 62/746,454, filed Oct. 16, 2018. U.S. application Ser. No. 16/421,391, filed May 23, 2019, claims the benefit of U.S. Provisional Ser. No. 62/680,955, filed Jun. 5, 2018; U.S. Provisional Ser. No. 62/712,041, filed Jul. 30, 2018; and U.S. Provisional Ser. No. 62/746,454, filed Oct. 16, 2018.

The present application is also related to U.S. application Ser. No. 13/601,915, filed Aug. 31, 2012 and issued on Jun. 16, 2015 as U.S. Pat. No. 9,060,210; U.S. application Ser. No. 13/601,927, filed Aug. 31, 2012 and issued on Sep. 23, 2014 as U.S. Pat. No. 8,842,007; U.S. application Ser. No. 13/601,933, filed Aug. 31, 2012 and issued on Nov. 26, 2013 as U.S. Pat. No. 8,595,763; U.S. application Ser. No. 14/510,481, filed Oct. 9, 2014; U.S. application Ser. No. 14/710,438, filed May 12, 2015; U.S. application Ser. No. 14/877,691, filed Oct. 7, 2015; U.S. application Ser. No. 15/264,928, filed Sep. 14, 2016; U.S. application Ser. No. 16/411,704, filed May 14, 2019; U.S. application Ser. No. 16/411,710, filed May 14, 2019; U.S. application Ser. No. 16/411,713, filed May 14, 2019, all of which are incorporated herein by reference in their entirety.

TECHNICAL FIELD

The present document relates to techniques for identifying multimedia content and associated information on a television device or a video server delivering multimedia content, and enabling embedded software applications to utilize the multimedia content to provide content and services synchronous with that multimedia content. Various embodiments relate to methods and systems for providing automated audio analysis to identify and extract information from television programming content depicting sporting events, so as to create metadata associated with video highlights for in-game and post-game viewing.

DESCRIPTION OF THE RELATED ART

Enhanced television applications such as interactive advertising and enhanced program guides with pre-game, in-game and post-game interactive applications have long been envisioned. Existing cable systems that were originally engineered for broadcast television are being called on to support a host of new applications and services including interactive television services and enhanced (interactive) programming guides.

Some frameworks for enabling enhanced television applications have been standardized. Examples include the OpenCable™ Enhanced TV Application Messaging Specification, as well as the Tru2way specification, which refer to interactive digital cable services delivered over a cable video network and which include features such as interactive program guides, interactive ads, games, and the like. Additionally, cable operator "OCAP" programs provide interactive services such as e-commerce shopping, online banking, electronic program guides, and digital video recording. These efforts have enabled the first generation of video-synchronous applications, synchronized with video content delivered by the programmer/broadcaster, and providing added data and interactivity to television programming.

Recent developments in video/audio content analysis technologies and capable mobile devices have opened up an array of new possibilities in developing sophisticated applications that operate synchronously with live TV programming events. These new technologies and advances in audio signal processing and computer vision, as well as improved computing power of modern processors, allow for real-time generation of sophisticated programming content highlights accompanied by metadata that are currently lacking in the television and other media environments.

SUMMARY

A system and method are presented to enable automatic real-time processing of audio signals extracted from sporting event television programming content, for detecting, selecting, and tracking short bursts of high-energy audio events, such as tennis ball hits in a tennis match.

In at least one embodiment, initial audio signal analysis is performed in the time domain, so as to detect short bursts of high-energy audio and generate an indicator of potential occurrence of audio events of interest.

In at least one embodiment, detected time-domain audio events are further processed and revised by invoking consideration of spectral characteristics of the audio signal in the neighborhood of detected time-domain audio events. A spectrogram is constructed for the analyzed audio signal, and pronounced spectral magnitude peaks are extracted by maximum magnitude suppression in a sliding 2-D diamond-shaped time-frequency area filter. In addition, a spectrogram time-spread range is constructed around audio event points previously obtained by the time-domain analysis, and a qualifier for each audio event point is established by counting spectral magnitude peaks in this time-spread range. The time-spread range can be established in any of a multitude of ways; for example, the spectral neighborhood of the time-domain detected audio events can be analyzed immediately before the audio event occurred, or immediately after the audio event occurred, or in a time and frequency range around the detected audio event. In one embodiment, as an exemplary case, only audio events obtained by time-domain analysis with associated qualifier value below a threshold are accepted as viable audio events.

Any of a number of spectral neighborhood analysis methods can be applied, including, but not limited to, spectral analysis performed by counting pronounced spectral peaks in various time-spread ranges in the neighborhoods of detected time-domain audio events, as described in the previous paragraph.

In at least one embodiment, a schedule of minimal time distance between adjacent audio event points is considered. Undesirable redundant audio events that are in close proximity to each other are removed, and a final audio event timeline for the game is formed.

In at least one embodiment, once the audio event information has been extracted, it is automatically appended to sporting event metadata associated with the sporting event video highlights, and can be subsequently used in connection with automatic generation of highlights.

In at least one embodiment, a method may be used to identify a boundary of a highlight of audiovisual content depicting an event. The method may include, at a data store, storing audio data depicting at least part of the event. The method may further include, at a processor, automatically analyzing the audio data to detect an audio event indicative of an occurrence to be included in the highlight, and designating a time index, within the audiovisual content, before or after the audio event as the boundary, the boundary comprising one of a beginning of the highlight and an end of the highlight.

The audiovisual content may include a television broadcast.

The audiovisual content may include an audiovisual stream. The method may further include, prior to storing audio data depicting at least part of the event, extracting the audio data from the audiovisual stream.

The audiovisual content may include stored audiovisual content. The method may further include, prior to storing audio data depicting at least part of the event, extracting the audio data from the stored audiovisual content.

In at least one embodiment, the event may be a sporting event. The highlight may depict a portion of the sporting event deemed to be of particular interest to at least one user. The occurrence may be any occurrence associated with a sporting event, such as for example a tennis serve.

The method may further include, at an output device, playing at least one of the audiovisual content and the highlight during detection of the audio event.

The method may further include, prior to detecting the audio event, pre-processing the audio data by resampling the audio data to a desired sampling rate.

The method may further include, prior to detecting the audio event, pre-processing the audio data by filtering the audio data to perform at least one of reducing noise, and selecting a spectral band of interest.

Automatically analyzing the audio data to detect the audio events may include processing the audio data, in a time domain, to generate initial row indicators of occurrences of distinct energy burst events.

Processing the audio data may include selecting an analysis time window size, selecting an analysis window overlap region size, sliding an analysis time window along the audio data, computing a normalized magnitude for window samples at each position of the analysis time window, calculating an average sample magnitude at each position of the analysis time window, generating a log magnitude indicator at each position of the analysis time window, and using the normalized magnitude, average sample magnitude, and log magnitude indicator to populate a row time-domain event vector with a computed indicator and associated position values.

The method may further include processing the audio data to generate a spectrogram for the audio data, and analyzing the audio data and the spectrogram in a joint time-frequency domain to generate qualifying indicators of occurrences of the audio events, comprising distinct energy burst events detected in the time domain.

Analyzing the audio data and the spectrogram in the joint time-frequency domain may include constructing a 2-D diamond-shaped spectrogram area filter to facilitate detection and selection of pronounced time-frequency magnitude peaks, sliding the area filter along time and frequency spectrogram axes, checking a central peak magnitude against all remaining peak magnitudes at each time-frequency position of the area filter, retaining only central peak magnitudes that are greater than all other peak magnitudes at each time-frequency position of the area filter, and populating a spectral event vector with all retained central peak magnitudes.

The method may further include, in the time domain and in a frequency domain, performing joint analysis of audio events detected in the time domain.

The method may further include determining a spectrogram time-spread range around each of the audio events, and using the time-spread ranges for event qualifier computation.

Using the time-spread ranges for event qualifier computation may include counting spectral event vector elements positioned in the spectrogram time-spread range around the audio events detected in the time domain, recording the spectral event vector elements as qualifiers for each of the audio events, counting a number of spectrogram magnitude peaks within a time spread range to obtain a count, and generating a revised event vector containing only time-domain event points at which the count is below a threshold.

Using the time-spread ranges for event qualifier computation may further include comparing the qualifier associated with each of the audio events detected in the time domain, against a threshold, suppressing all time-domain detected events with a qualifier above the threshold, and generating a qualifier revised event vector.

The method may further include processing the qualifier revised event vector according to a schedule of minimal time distances between adjacent events, and suppressing undesirable, redundant audio events to obtain a final desired event timeline for the event.

The method may further include automatically appending at least one of the audio events, the time index, and an indicator of the occurrence to metadata associated with the highlight.

In at least one embodiment, the occurrence may be associated with a short audio burst.

In at least one embodiment, the event may be a sporting event. For example, the event may be a tennis game, and the occurrence may be a tennis serve.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

Definitions

Figure 1A:
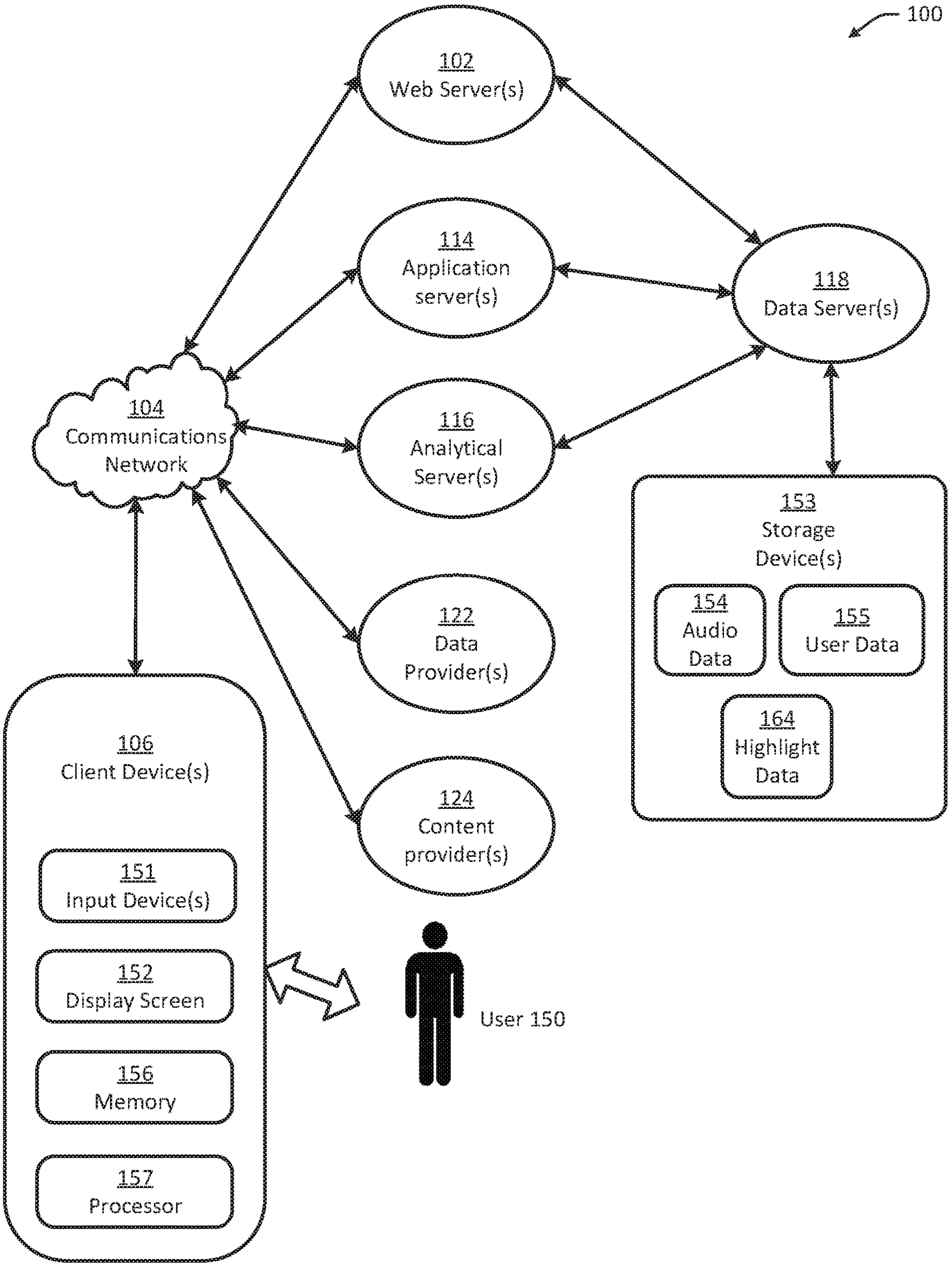
FIG. 1A is a block diagram depicting a hardware architecture according to a client/server embodiment, wherein event content is provided via a network-connected content provider.

The following definitions are presented for explanatory purposes only, and are not intended to limit scope.

- Event: For purposes of the discussion herein, the term "event" (not "audio event") refers to a game, session, match, series, performance, program, concert, and/or the like, or portion thereof (such as an act, period, quarter, half, inning, scene, chapter, or the like). An event may be a sporting event, entertainment event, a specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight shows for any audiovisual, audio, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.
- Highlight: An excerpt or portion of an event, or of content associated with an event that is deemed to be of particular interest to one or more users. A highlight can be of any length. In general, the techniques described herein provide mechanisms for identifying and presenting a set of customized highlights (which may be selected based on particular characteristics and/or preferences of the user) for any suitable event. "Highlight" can also be used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the audiovisual stream depicting the event itself), or retrieved from any number of other sources. Different types of highlights can be provided, including for example, occurrences (plays), strings, possessions, and sequences, all of which are defined below. Highlights need not be of fixed duration, but may incorporate a start offset and/or end offset, as described below.
- Clip: A portion of an audio, visual, or audiovisual representation of an event. A clip may correspond to or represent a highlight. In many contexts herein, the term "segment" is used interchangeably with "clip". A clip may be a portion of an audio stream, video stream, or audiovisual stream, or it may be a portion of stored audio, video, or audiovisual content.
- Content Delineator: One or more video frames that indicate the start or end of a highlight.
- Occurrence: Something that takes place during an event. Examples include: a goal, a play, a down, a hit, a save, a shot on goal, a basket, a steal, a snap or attempted snap, a near-miss, a fight, a beginning or end of a game, quarter, half, period, or inning, a pitch, a penalty, an injury, a dramatic incident in an entertainment event, a song, a solo, and/or the like. Occurrences can also be unusual, such as a power outage, an incident with an unruly fan, and/or the like. Detection of such occurrences can be used as a basis for determining whether or not to designate a particular portion of an audiovisual stream as a highlight. Occurrences are also referred to herein as "plays", for ease of nomenclature, although such usage should not be construed to limit scope. Occurrences may be of any length, and the representation of an occurrence may be of varying length. For example, as mentioned above, an extended representation of an occurrence may include footage depicting the period of time just before and just after the occurrence, while a brief representation may include just the occurrence itself. Any intermediate representation can also be provided. In at least one embodiment, the selection of a duration for a representation of an occurrence can depend on user preferences, available time, determined level of excitement for the occurrence, importance of the occurrence, and/or any other factors.
- Offset: The amount by which a highlight length is adjusted. In at least one embodiment, a start offset and/or end offset can be provided, for adjusting start and/or end times of the highlight, respectively. For example, if a highlight depicts a goal, the highlight may be extended (via an end offset) for a few seconds so as to include celebrations and/or fan reactions following the goal. Offsets can be configured to vary automatically or manually, based for example on an amount of time available for the highlight, importance and/or excitement level of the highlight, and/or any other suitable factors.

String: A series of occurrences that are somehow linked or related to one another. The occurrences may take place within a possession (defined below), or may span multiple possessions. The occurrences may take place within a sequence (defined below), or may span multiple sequences. The occurrences can be linked or related because of some thematic or narrative connection to one another, or because one leads to another, or for any other reason. One example of a string is a set of passes that lead to a goal or basket. This is not to be confused with a "text string," which has the meaning ordinarily ascribed to it in the computer programming arts.

Possession: Any time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, a possession is defined as a half-inning. For football, a possession can include a number of sequences in which the same team has the ball. For other types of sporting events as well as for non-sporting events, the term "possession" may be somewhat of a misnomer, but is still used herein for illustrative purposes. Examples in a non-sporting context may include a chapter, scene, act, or the like. For example, in the context of a music concert, a possession may equate to performance of a single song. A possession can include any number of occurrences.

Sequence: A time-delimited portion of an event that includes one continuous time period of action. For example, in a sporting event, a sequence may begin when action begins (such as a face-off, tipoff, or the like), and may end when the whistle is blown to signify a break in the action. In a sport such as baseball or football, a sequence may be equivalent to a play, which is a form of occurrence. A sequence can include any number of possessions, or may be a portion of a possession.

Highlight show: A set of highlights that are arranged for presentation to a user. The highlight show may be presented linearly (such as an audiovisual stream), or in a manner that allows the user to select which highlight to view and in which order (for example by clicking on links or thumbnails). Presentation of highlight show can be non-interactive or interactive, for example allowing a user to pause, rewind, skip, fast-forward, communicate a preference for or against, and/or the like. A highlight show can be, for example, a condensed game. A highlight show can include any number of contiguous or noncontiguous highlights, from a single event or from multiple events, and can even include highlights from different types of events (e.g. different sports, and/or a combination of highlights from sporting and non-sporting events).

User/viewer: The terms "user" or "viewer" interchangeably refer to an individual, group, or other entity that is watching, listening to, or otherwise experiencing an event, one or more highlights of an event, or a highlight show. The terms "user" or "viewer" can also refer to an individual, group, or other entity that may at some future time watch, listen to, or otherwise experience either an event, one or more highlights of an event, or a highlight show. The term "viewer" may be used for descriptive purposes, although the event need not have a visual component, so that the "viewer" may instead be a listener or any other consumer of content.

Excitement level: A measure of how exciting or interesting an event or highlight is expected to be for a particular user or for users in general. Excitement levels can also be determined with respect to a particular occurrence or player. Various techniques for measuring or assessing excitement level are discussed in the above-referenced related applications. As discussed, excitement level can depend on occurrences within the event, as well as other factors such as overall context or importance of the event (playoff game, pennant implications, rivalries, and/or the like). In at least one embodiment, an excitement level can be associated with each occurrence, string, possession, or sequence within an event. For example, an excitement level for a possession can be determined based on occurrences that take place within that possession. Excitement level may be measured differently for different users (e.g. a fan of one team vs. a neutral fan), and it can depend on personal characteristics of each user.

Metadata: Data pertaining to and stored in association with other data. The primary data may be media such as a sports program or highlight.

Video data. A length of video, which may be in digital or analog form. Video data may be stored at a local storage device, or may be received in real-time from a source such as a TV broadcast antenna, a cable network, or a computer server, in which case it may also be referred to as a "video stream". Video data may or may not include an audio component; if it includes an audio component, it may be referred to as "audiovisual data" or an "audiovisual stream".

Audio data. A length of audio, which may be in digital or analog form. Audio data may be the audio component of audiovisual data or an audiovisual stream, and may be isolated by extracting the audio data from the audiovisual data. Audio data may be stored at a local storage, or may be received in real-time from a source such as a TV broadcast antenna, a cable network, or a computer server, in which case it may also be referred to as an "audio stream".

Stream. An audio stream, video stream, or audiovisual stream.

Time index. An indicator of a time, within audio data, video data, or audiovisual data, at which an audio event occurs or that otherwise pertains to a designated segment, such as a highlight.

Spectrogram. A visual representation of the spectrum of frequencies of a signal, such as an audio stream, as it varies with time. A spectrogram may be, for example, a two-dimensional time-frequency representation of audio signal derived by applying a Short Time Fourier Transform (STFT) to the audio signal.

Analysis window. A designated subset of video data, audio data, audiovisual data, spectrogram, stream, or otherwise processed version of a stream or data, at which one step of analysis is to be focused. The audio data, video data, audiovisual data, or spectrogram may be analyzed, for example, in segments using a moving analysis window and/or a series of analysis windows covering different segments of the data or spectrogram.

Boundary. A demarcation separating one audio, video, and/or audiovisual segment from another. A boundary may be the beginning or end of a segment such as a highlight of audiovisual content such as a television broadcast. A boundary may be tentative (i.e., preliminary and/or intended for subsequent replacement) or final. In some embodiments, a highlight may first be identified with tentative boundaries. Audio analysis may be performed to identify audio events that are then used to locate (in time) the final boundaries of the highlight.

Audio Event. A portion of an audio, video, or audiovisual stream representing an audible occurrence within an event. An audio event may be used to locate a boundary of a highlight, and may optionally include sounds of short duration and high intensity. One exemplary audio event is the sound made by a tennis racket hitting a tennis ball during a tennis serve.

Overview

According to various embodiments, methods and systems are provided for automatically creating time-based metadata associated with highlights of television programming of a sporting event or the like, wherein such video highlights and associated metadata are generated synchronously with the television broadcast of a sporting event or the like, or while the sporting event video content is being streamed via a video server from a storage device after the television broadcast of a sporting event.

In at least one embodiment, an automated video highlights and associated metadata generation application may receive a live broadcast audiovisual stream, or a digital audiovisual stream received via a computer server. The application may then process an extracted audio signal, for example using digital signal processing techniques, to detect short bursts of high energy audio events, such as tennis ball hits in a tennis match or the like.

Interactive television applications may enable timely, relevant presentation of highlighted television programming content to users watching television programming either on a primary television display, or on a secondary display such as tablet, laptop or a smartphone. In at least one embodiment, a set of video clips representing television broadcast content highlights may be generated and/or stored in real-time, along with a database containing time-based metadata describing, in more detail, the occurrences presented by the highlight video clips.

In various embodiments, the metadata accompanying the video clips can be any information such as textual information, images, and/or any type of audiovisual data. Metadata may be associated with in-game and/or post-game video content highlights, and may present occurrences detected by real-time processing of audio signals extracted from sporting event television programming. Event information may be detected by analyzing an audio signal to identify key occurrences in the game, such as important plays. Audio events indicating such key occurrences may include, for example, tennis ball hits in tennis matches, or a cheering crowd noise following an audio event, audio announcements, music, and/or the like. In various embodiments, the system and method described herein enable automatic metadata generation and video highlight processing, wherein boundaries of audio events (for example, the beginning or end of an audio event) can be detected and determined by analyzing a digital audio stream.

In at least one embodiment, a system receives a broadcast audiovisual stream, or other audiovisual content obtained via a computer server, extracts an audio portion of the audiovisual stream or content, and processes the extracted audio signal using digital signal processing techniques, so as to detect distinct high-energy audio bursts, such as for example those associated with tennis ball hits in tennis games. Such processing can include, for example, any or all of the following steps:

- Receiving, decoding, and/or resampling a received compressed audio signal (for example, to a desired sampling rate);
- Pre-filtering the audio signal for noise reduction, click removal, and/or audience noise reduction through use of any of a number of interchangeable digital filtering stages;
- Performing time-domain analysis on the audio signal;
- Generating a time-frequency spectrogram for the audio signal;
- Performing a time-frequency analysis of the audio signal;
- Detecting audio events indicative of exciting occurrences in successive stages, with time-domain detection results fed into a spectral neighborhood analysis;
- Two-level filtering of the audio signal with back adjustments of time intervals between audio events;
- Analyzing a distinct spectral spread in the audio time-frequency representation at audio events pointed to by time-domain analysis to generate a unique qualifier for time-domain detected audio events;
- Analyzing the qualifier to reduce false positive detections due to undesirable audio peaking attributed to audience noise such as clapping and cheering;
- Adjusting audio event positions in accordance with a schedule of minimal time distances between consecutive audio events; and
- Automatically appending the extracted information regarding high-energy audio bursts to metadata associated with video highlights for the event.

In at least one embodiment, an initial audio signal analysis is performed in the time domain, so as to detect short bursts of high-energy audio and generate of audio events representing potential exciting occurrences. An analyzing time window of a selected size may be used to compute an indicator of the average level of audio energy at overlapping window positions. Subsequently, a row event vector may be populated with indicator/position pairs.

In at least one embodiment, time-domain detected audio events are revised by considering spectral characteristics of the audio signal in the neighborhood of audio events. A spectrogram may be constructed for the analyzed audio signal, and a 2-D diamond-shaped time-frequency area filtering process may be performed to detect and extract pronounced spectral magnitude peaks. A spectral event vector may be populated with magnitude and time-frequency coordinates for each selected peak.

In at least one embodiment, one or more spectrogram time-spread range(s) are constructed around audio event time positions obtained in the time-domain analysis. By counting and recording spectral event vector peaks in a particular time spread range, an audio event qualifier may be established for each time-domain detected audio event. In at least one embodiment, audio event time positions having an audio event qualifier value below a certain threshold are accepted as viable audio event points, and any remaining audio event time positions are suppressed. In general, qualification of the time-domain detected audio events can be performed based on spectral analysis of each individual time range around a detected audio event, or it can be based on a spectral analysis of a combination of time ranges around a detected audio event.

In at least one embodiment, the spectrogram-based revised (qualified) audio event time positions are processed by considering a schedule of minimal time distances between consecutive audio events, and by subsequent removal of undesirable, redundant audio events, to obtain a final desired audio event timeline for the game.

In various embodiments, any or all of the above-described techniques can be applied singly or in any suitable combination.

In various embodiments, a method for identifying a boundary of a highlight may include some or all of the following steps:

- Capturing audiovisual content, such as television programming content or an audiovisual stream;
- Extracting and processing a digital audio stream from the audiovisual content;
- Performing time-domain analysis of the audio signal for detection of distinct high-energy audio events;
- Generating a time-frequency audio spectrogram;
- Performing joined time-frequency analysis of the audio signal to detect pronounced magnitude peaks;
- Generating a qualifier for the time-domain detected audio events based on analysis of the spectral neighborhood of the time-domain detected audio events;
- Revising the time-domain generated audio events based on the qualifier value; and
- Performing audio event distance filtering by imposing minimum intervals between consecutive audio events.

In addition, initial pre-processing of decoded audio stream can be performed for at least one of noise reduction, click removal, and audience noise reduction, with a choice of interchangeable digital filtering stages.

In at least one embodiment, independent pre-processing may be performed to analyze the audio signal in the time domain and/or the frequency domain. Audio signal analysis may be performed in the time domain for generating initial indicators of occurrences of distinct high-energy audio events. An analyzing time window size may be selected together with a size of an analysis window overlap region. The analyzing time window may be advanced along the audio signal. At each window position, a normalized magnitude for window samples may be computed, followed by expansion to full-scale dynamic range.

An average sample magnitude may be calculated for the analysis window, and a log magnitude indicator may be generated at each analysis window position. A time-domain event vector may be populated with computed pairs of analysis window indicator and associated position.

A spectrogram may be constructed for the analysis of audio signal in the frequency domain. A 2-D diamond-shaped spectrogram area filter may be constructed for detection and selection of pronounced time-frequency magnitude peaks. The area filter may be advanced along the time and frequency spectrogram axes, and at each time-frequency position, an area filter central peak magnitude may be checked against all remaining peak magnitudes. In at least one embodiment, the area filter central peak magnitude is retained only if it is greater than all other area filter peak magnitudes. The spectral event vector may be populated with all retained area filter central peak magnitudes.

A joint analysis of audio events detected in the time domain and in the time-frequency domain may be performed. A spectrogram time-spread range around selected time-domain audio events may be determined, and may be used for audio event qualifier computation. Spectral event vector elements positioned in the spectrogram time-spread range at time-domain detected points may be counted and recorded as qualifiers for time-domain detected audio event. The qualifier associated with each time-domain detected audio event may be compared against a threshold, and all time-domain detected audio events with a qualifier above the threshold may be suppressed.

A qualifier revised event vector may be generated. The qualifier revised event vector may further be processed according to a schedule of minimal time distances between adjacent audio events. By subsequent suppression of undesirable, redundant audio events, a final desired audio event timeline for the game may be obtained. The audio event information may further be processed and automatically appended to metadata associated with the sporting event television programming highlights.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box (STB), game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Referring now to FIG. 1A, there is shown a block diagram depicting hardware architecture of a system 100 for automatically analyzing audio data to detect an audio event to designate a boundary of a highlight, according to a client/server embodiment. Event content, such as an audiovisual stream including audio content, may be provided via a network-connected content provider 124. An example of such a client/server embodiment is a web-based implementation, wherein each of one or more client devices 106 runs a browser or app that provides a user interface for interacting with content from various servers 102, 114, 116, including data provider(s) servers 122, and/or content provider(s) servers 124, via communications network 104. Transmission of content and/or data in response to requests from client device 106 can take place using any known protocols and languages, such as Hypertext Markup Language (HTML), Java, Objective C, Python, JavaScript, and/or the like.

Client device 106 can be any electronic device, such as a desktop computer, laptop computer, television, smartphone, tablet, music player, audio device, kiosk, set-top box, game system, wearable device, consumer electronic device, and/or the like. In at least one embodiment, client device 106 has a number of hardware components well known to those skilled in the art. Input device(s) 151 can be any component(s) that receive input from user 150, including, for example, a handheld remote control, keyboard, mouse, stylus, touch-sensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 152 can be any component that graphically displays information, video, content, and/or the like, including depictions of events, highlights, and/or the like. Such output may also include, for example, audiovisual content, data visualizations, navigational elements, graphical elements, queries requesting information and/or parameters for selection of content, metadata, and/or the like. In at least one embodiment, where only some of the desired output is presented at a time, a dynamic control, such as a scrolling mechanism, may be available via input device(s) 151 to choose which information is currently displayed, and/or to alter the manner in which the information is displayed.

Processor 157 can be a conventional microprocessor for performing operations on data under the direction of software, according to well-known techniques. Memory 156 can be random-access memory, having a structure and architecture as are known in the art, for use by processor 157 in the course of running software for performing the operations described herein. Client device 106 can also include local storage (not shown), which may be a hard drive, flash drive, optical or magnetic storage device, web-based (cloud-based) storage, and/or the like.

Any suitable type of communications network 104, such as the Internet, a television network, a cable network, a cellular network, and/or the like can be used as the mechanism for transmitting data between client device 106 and various server(s) 102, 114, 116 and/or content provider(s) 124 and/or data provider(s) 122, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 106 transmits requests for data and/or content via communications network 104, and receives responses from server(s) 102, 114, 116 containing the requested data and/or content.

In at least one embodiment, the system of FIG. 1A operates in connection with sporting events; however, the teachings herein apply to nonsporting events as well, and it is to be appreciated that the technology described herein is not limited to application to sporting events. For example, the technology described herein can be utilized to operate in connection with a television show, movie, news event, game show, political action, business show, drama, and/or other episodic content, or for more than one such event.

In at least one embodiment, system 100 identifies highlights of audiovisual content depicting an event, such as a broadcast of a sporting event, by analyzing audio content representing the event. This analysis may be carried out in real-time. In at least one embodiment, system 100 includes one or more web server(s) 102 coupled via a communications network 104 to one or more client devices 106. Communications network 104 may be a public network, a private network, or a combination of public and private networks such as the Internet. Communications network 104 can be a LAN, WAN, wired, wireless and/or combination of the above. Client device 106 is, in at least one embodiment, capable of connecting to communications network 104, either via a wired or wireless connection. In at least one embodiment, client device may also include a recording device capable of receiving and recording events, such as a DVR, PVR, or other media recording device. Such recording device can be part of client device 106, or can be external; in other embodiments, such recording device can be omitted. Although FIG. 1A shows one client device 106, system 100 can be implemented with any number of client device(s) 106 of a single type or multiple types.

Web server(s) 102 may include one or more physical computing devices and/or software that can receive requests from client device(s) 106 and respond to those requests with data, as well as send out unsolicited alerts and other messages. Web server(s) 102 may employ various strategies for fault tolerance and scalability such as load balancing, caching and clustering. In at least one embodiment, web server(s) 102 may include caching technology, as known in the art, for storing client requests and information related to events.

Web server(s) 102 may maintain, or otherwise designate, one or more application server(s) 114 to respond to requests received from client device(s) 106. In at least one embodiment, application server(s) 114 provide access to business logic for use by client application programs in client device(s) 106. Application server(s) 114 may be co-located, co-owned, or co-managed with web server(s) 102. Application server(s) 114 may also be remote from web server(s) 102. In at least one embodiment, application server(s) 114 interact with one or more analytical server(s) 116 and one or more data server(s) 118 to perform one or more operations of the disclosed technology.

One or more storage devices 153 may act as a "data store" by storing data pertinent to operation of system 100. This data may include, for example, and not by way of limitation, audio data 154 representing one or more audio signals. Audio data 154 may, for example, be extracted from audiovisual streams or stored audiovisual content representing sporting events and/or other events.

Audio data 154 can include any information related to audio embedded in the audiovisual stream, such as an audio stream that accompanies video imagery, processed versions of the audiovisual stream, and metrics and/or vectors related to audio data 154, such as time indices, durations, magnitudes, and/or other parameters of events. User data 155 can include any information describing one or more users 150, including for example, demographics, purchasing behavior, audiovisual stream viewing behavior, interests, preferences, and/or the like. Highlight data 164 may include highlights, highlight identifiers, time indicators, categories, excitement levels, and other data pertaining to highlights. Audio data 154, user data 155, and highlight data 164 will be described in detail subsequently.

Notably, many components of system 100 may be, or may include, computing devices. Such computing devices may each have an architecture similar to that of client device 106, as shown and described above. Thus, any of communications network 104, web servers 102, application servers 114, analytical servers 116, data providers 122, content providers 124, data servers 118, and storage devices 153 may include one or more computing devices, each of which may optionally have an input device 151, display screen 152, memory 156, and/or a processor 157, as described above in connection with client devices 106.

In an exemplary operation of system 100, one or more users 150 of client devices 106 view content from content providers 124, in the form of audiovisual streams. The audiovisual streams may show events, such as sporting events. The audiovisual streams may be digital audiovisual streams that can readily be processed with known computer vision techniques.

As the audiovisual streams are displayed, one or more components of system 100, such as client devices 106, web servers 102, application servers 114, and/or analytical servers 116, may analyze the audiovisual streams, identify highlights within the audiovisual streams, and/or extract metadata from the audiovisual stream, for example, from an audio component of the stream. This analysis may be carried out in response to receipt of a request to identify highlights and/or metadata for the audiovisual stream. Alternatively, in another embodiment, highlights and/or metadata may be identified without a specific request having been made by user 150. In yet another embodiment, the analysis of audiovisual streams can take place without an audiovisual stream being displayed.

In at least one embodiment, user 150 can specify, via input device(s) 151 at client device 106, certain parameters for analysis of audio data 154 (such as, for example, what event/games/teams to include, how much time user 150 has available to view the highlights, what metadata is desired, and/or any other parameters). User preferences can also be extracted from storage, such as from user data 155 stored in one or more storage devices 153, so as to customize analysis of audio data 154 without necessarily requiring user 150 to specify preferences. In at least one embodiment, user preferences can be determined based on observed behavior and actions of user 150, for example, by observing website visitation patterns, television watching patterns, music listening patterns, online purchases, previous highlight identification parameters, highlights and/or metadata actually viewed by user 150, and/or the like.

Additionally, or alternatively, user preferences can be retrieved from previously stored preferences that were explicitly provided by user 150. Such user preferences may indicate which teams, sports, players, and/or types of events are of interest to user 150, and/or they may indicate what type of metadata or other information related to highlights, would be of interest to user 150. Such preferences can therefore be used to guide analysis of the audiovisual stream to identify highlights and/or extract metadata for the highlights.

Analytical server(s) 116, which may include one or more computing devices as described above, may analyze live and/or recorded feeds of play-by-play statistics related to one or more events from data provider(s) 122. Examples of data provider(s) 122 may include, but are not limited to, providers of real-time sports information such as STATS™, Perform (available from Opta Sports of London, UK), and SportRadar of St. Gallen, Switzerland. In at least one embodiment, analytical server(s) 116 generate different sets of excitement levels for events; such excitement levels can then be stored in conjunction with highlights identified by or received by system 100 according to the techniques described herein.

Application server(s) 114 may analyze the audiovisual stream to identify the highlights and/or extract the metadata. Additionally, or alternatively, such analysis may be carried out by client device(s) 106. The identified highlights and/or extracted metadata may be specific to a user 150; in such case, it may be advantageous to identify the highlights in client device 106 pertaining to a particular user 150. Client device 106 may receive, retain, and/or retrieve the applicable user preferences for highlight identification and/or metadata extraction, as described above. Additionally, or alternatively, highlight generation and/or metadata extraction may be carried out globally (i.e., using objective criteria applicable to the user population in general, without regard to preferences for a particular user 150). In such a case, it may be advantageous to identify the highlights and/or extract the metadata in application server(s) 114.

Content that facilitates highlight identification, audio analysis, and/or metadata extraction may come from any suitable source, including from content provider(s) 124, which may include websites such as YouTube, MLB.com, and the like; sports data providers; television stations; client- or server-based DVRs; and/or the like. Alternatively, content can come from a local source such as a DVR or other recording device associated with (or built into) client device 106. In at least one embodiment, application server(s) 114 generate a customized highlight show, with highlights and metadata, available to user 150, either as a download, or streaming content, or on-demand content, or in some other manner.

As mentioned above, it may be advantageous for user-specific highlight identification, audio analysis, and/or metadata extraction to be carried out at a particular client device 106 associated with a particular user 150. Such an embodiment may avoid the need for video content or other high-bandwidth content to be transmitted via communications network 104 unnecessarily, particularly if such content is already available at client device 106.

Figure 1B:
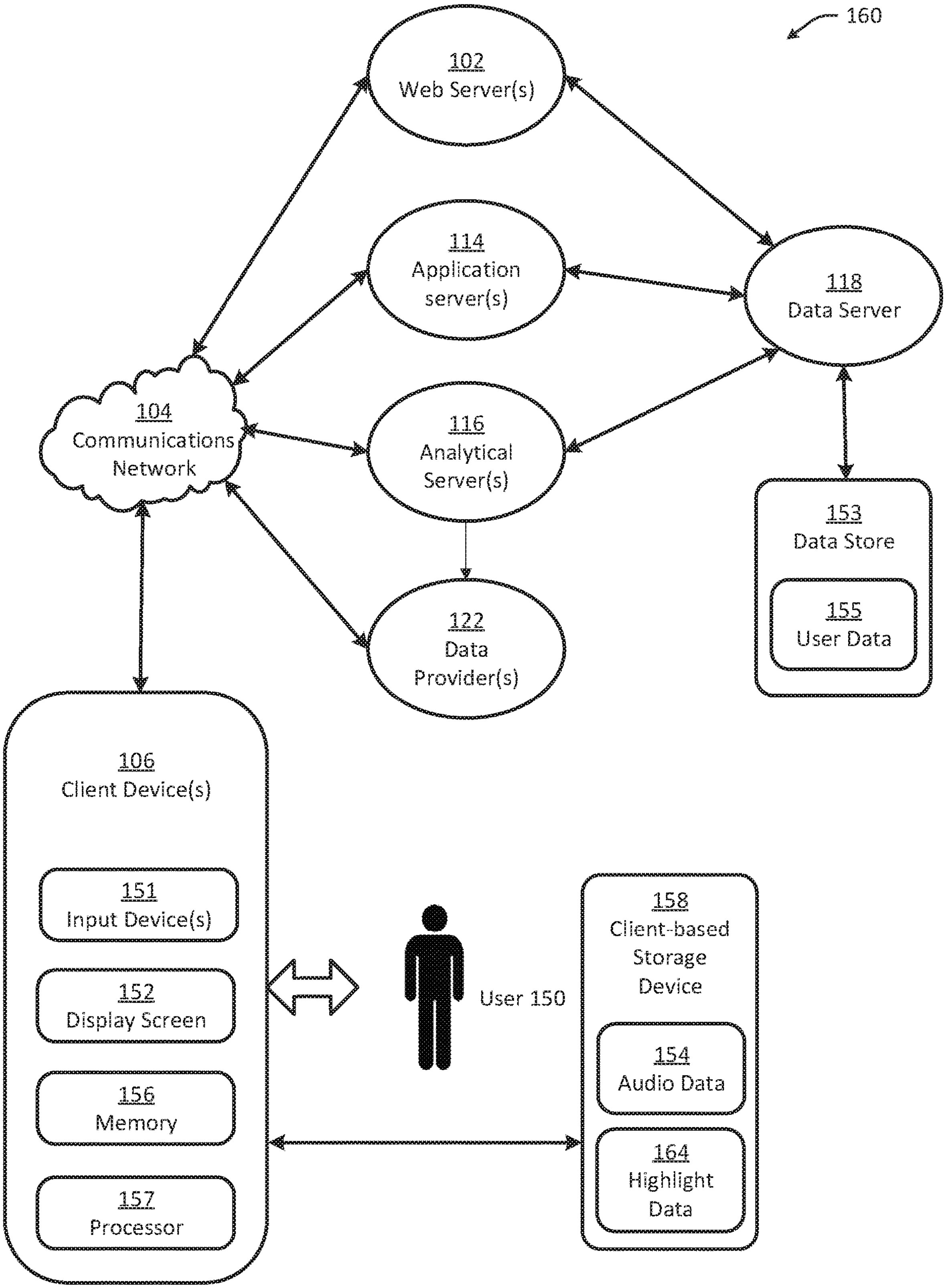
FIG. 1B is a block diagram depicting a hardware architecture according to another client/server embodiment, wherein event content is stored at a client-based storage device.

For example, referring now to FIG. 1B, there is shown an example of a system 160 according to an embodiment wherein at least some of audio data 154 and highlight data 164 are stored at client-based storage device 158, which may be any form of local storage device available to client device 106. An example is a DVR on which events may be recorded, such as for example video content for a complete sporting event. Alternatively, client-based storage device 158 can be any magnetic, optical, or electronic storage device for data in digital form; examples include flash memory, magnetic hard drive, CD-ROM, DVD-ROM, or other device integrated with client device 106 or communicatively coupled with client device 106. Based on the information provided by application server(s) 114, client device 106 may extract highlights and/or metadata from audiovisual content (for example, including audio data 154) stored at client-based storage device 158 and store the highlights and/or metadata as highlight data 164 without having to retrieve other content from a content provider 124 or other remote source. Such an arrangement can save bandwidth, and can usefully leverage existing hardware that may already be available to client device 106.

Returning to FIG. 1A, in at least one embodiment, application server(s) 114 may identify different highlights and/or extract different metadata for different users 150, depending on individual user preferences and/or other parameters. The identified highlights and/or extracted metadata may be presented to user 150 via any suitable output device, such as display screen 152 at client device 106. If desired, multiple highlights may be identified and compiled into a highlight show, along with associated metadata. Such a highlight show may be accessed via a menu, and/or assembled into a "highlight reel," or set of highlights, that plays for user 150 according to a predetermined sequence. User 150 can, in at least one embodiment, control highlight playback and/or delivery of the associated metadata via input device(s) 151, for example to:

select particular highlights and/or metadata for display;
pause, rewind, fast-forward;
skip forward to the next highlight;

return to the beginning of a previous highlight within the highlight show; and/or perform other actions.

Additional details on such functionality are provided in the above-cited related U.S. patent applications.

In at least one embodiment, one or more data server(s) 118 are provided. Data server(s) 118 may respond to requests for data from any of server(s) 102, 114, 116, for example to obtain or provide audio data 154, user data 155, and/or highlight data 164. In at least one embodiment, such information can be stored at any suitable storage device 153 accessible by data server 118, and can come from any suitable source, such as from client device 106 itself, content provider(s) 124, data provider(s) 122, and/or the like.

Figure 1C:
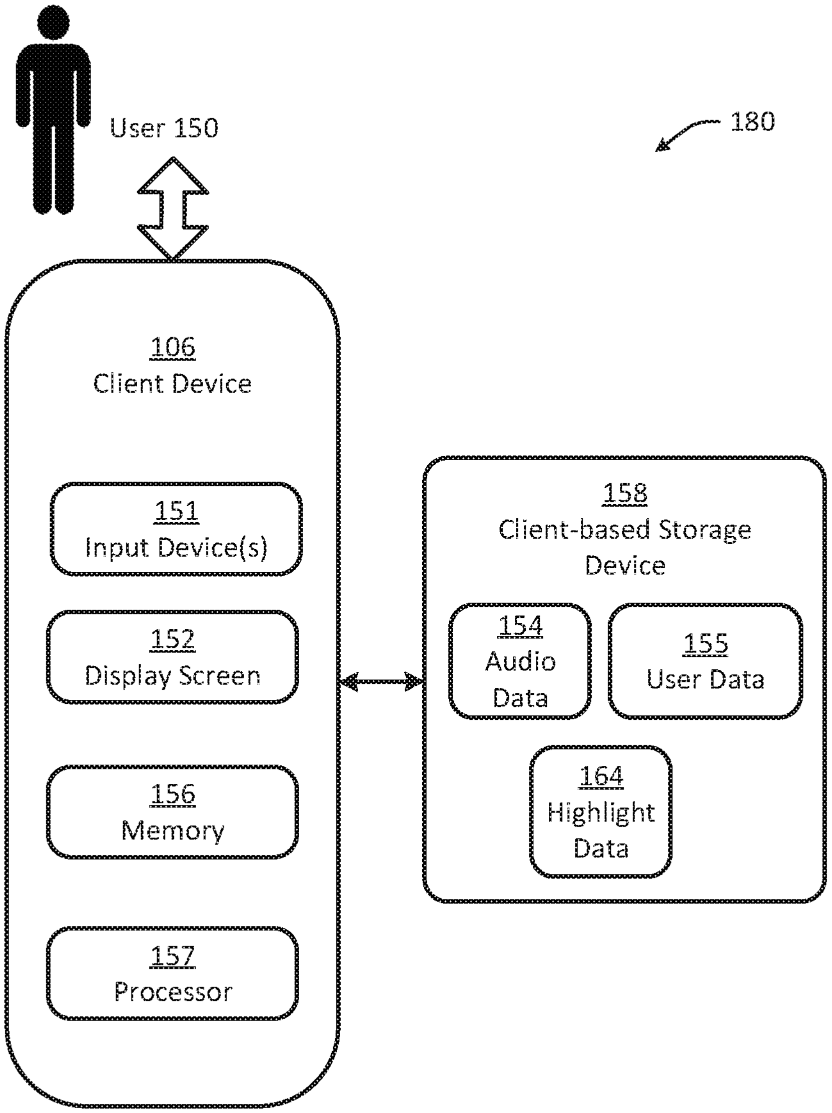
FIG. 1C is a block diagram depicting a hardware architecture according to a standalone embodiment.

Referring now to FIG. 1C, there is shown a system 180 according to an alternative embodiment wherein system 180 is implemented in a stand-alone environment. As with the embodiment shown in FIG. 1B, at least some of audio data 154, user data 155, and highlight data 164 may be stored at a client-based storage device 158, such as a DVR or the like. Alternatively, client-based storage device 158 can be flash memory or a hard drive, or other device integrated with client device 106 or communicatively coupled with client device 106.

User data 155 may include preferences and interests of user 150. Based on such user data 155, system 180 may extract highlights and/or metadata to present to user 150 in the manner described herein. Additionally, or alternatively, highlights and/or metadata may be extracted based on objective criteria that are not based on information specific to user 150.

Figure 1D:
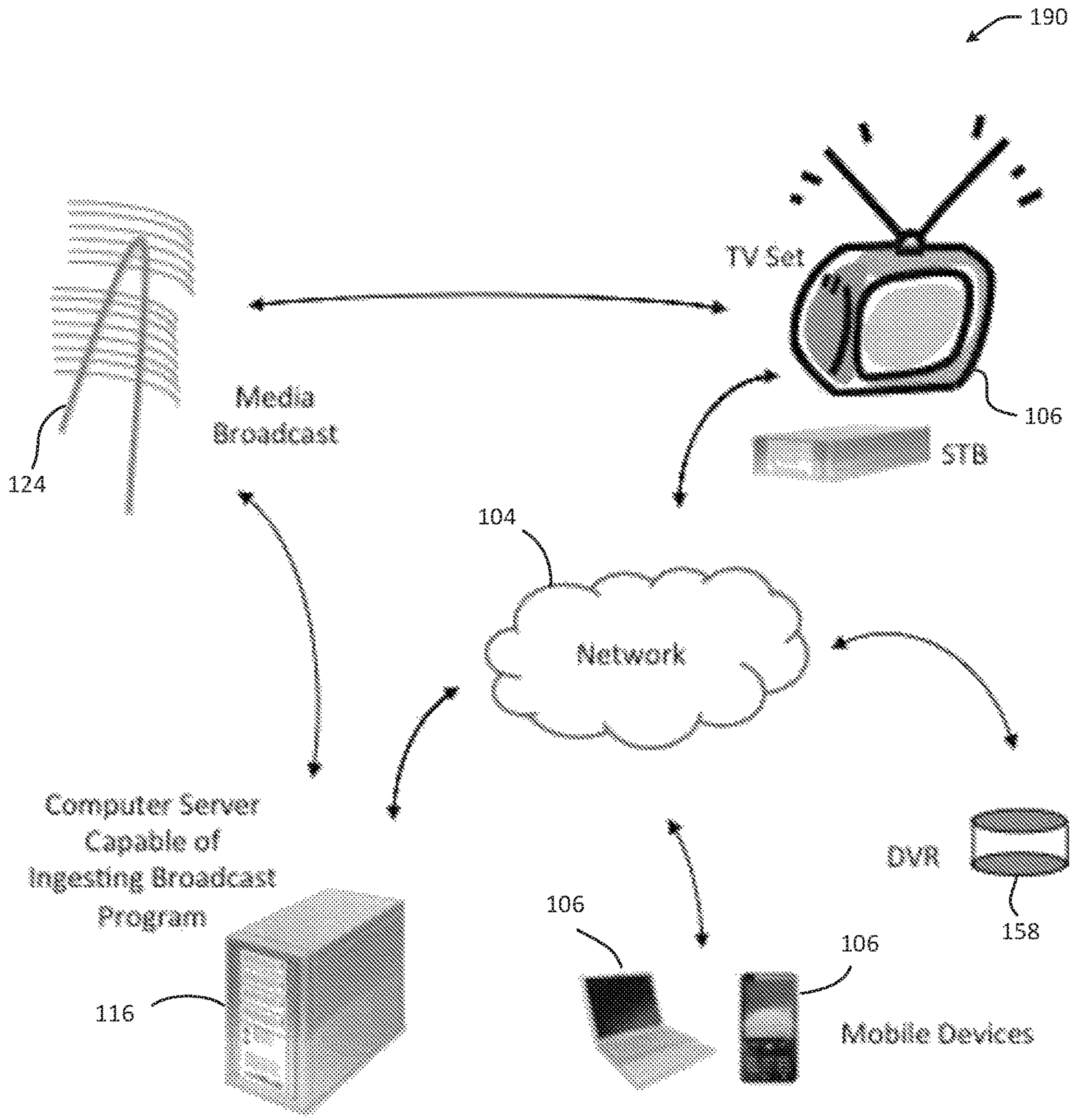
FIG. 1D is a block diagram depicting an overview of a system architecture, according to one embodiment.

Referring now to FIG. 1D, there is shown an overview of a system 190 with architecture according to an alternative embodiment. In FIG. 1D, system 190 includes a broadcast service such as content provider(s) 124, a content receiver in the form of client device 106 such as a television set with a STB, a video server such as analytical server(s) 116 capable of ingesting and streaming audiovisual content, such as television programming content, and/or other client devices 106 such as a mobile device and a laptop, which are capable of receiving and processing audiovisual content, such as television programming content, all connected via a network such as communications network 104. A client-based storage device 158, such as a DVR, may be connected to any of client devices 106 and/or other components, and may store an audiovisual stream, highlights, highlight identifiers, and/or metadata to facilitate identification and presentation of highlights and/or extracted metadata via any of client devices 106.

The specific hardware architectures depicted in FIGS. 1A, 1B, 1C, and 1D are merely exemplary. One skilled in the art will recognize that the techniques described herein can be implemented using other architectures. Many components depicted therein are optional and may be omitted, consolidated with other components, and/or replaced with other components.

In at least one embodiment, the system can be implemented as software written in any suitable computer programming language, whether in a standalone or client/server architecture. Alternatively, it may be implemented and/or embedded in hardware.

Data Structures

Figure 2:
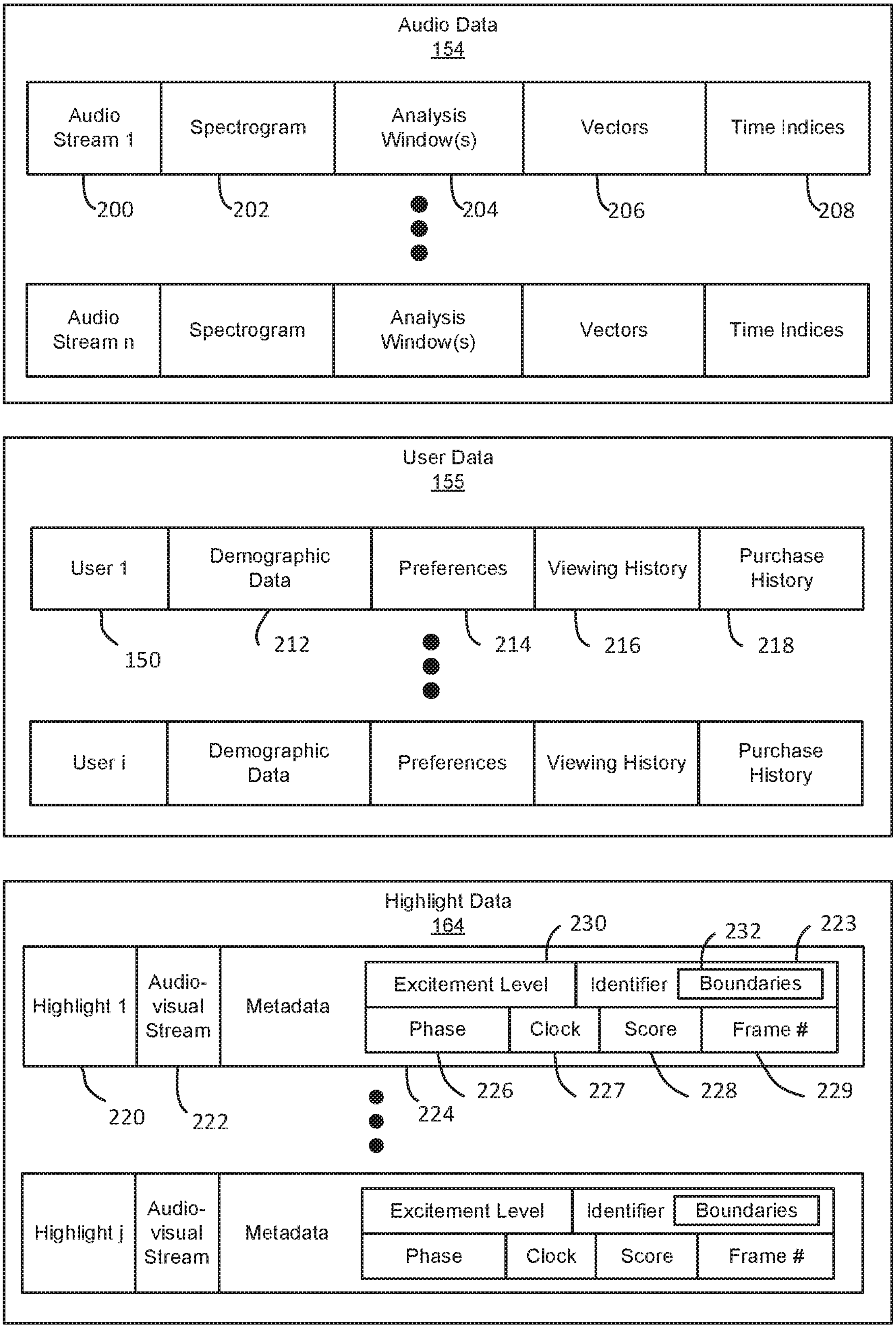
FIG. 2 is a schematic block diagram depicting examples of data structures that may be incorporated into the audio data, user data, and highlight data of FIGS. 1A, B, and 1C, according to one embodiment.

FIG. 2 is a schematic block diagram depicting examples of data structures that may be incorporated into audio data 154, user data 155, and highlight data 164, according to one embodiment.

As shown, audio data 154 may include a record for each of a plurality of audio streams 200. For illustrative purposes, audio streams 200 are depicted, although the techniques described herein can be applied to any type of audio data 154 or content, whether streamed or stored. The records of audio data 154 may include, in addition to the audio streams 200, other data produced pursuant to, or helpful for, analysis of the audio streams 200. For example, audio data 154 may include, for each audio stream 200, a spectrogram 202, one or more analysis windows 204, vectors 206, and time indices 208.

Each audio stream 200 may reside in the time domain. Each spectrogram 202 may be computed for the corresponding audio stream 200 in the time-frequency domain. Spectrogram 202 may be analyzed to more easily locate audio events.

Analysis windows 204 may be designations of predetermined time and/or frequency intervals of the spectrograms 202. Computationally, a single moving (i.e., "sliding") analysis window 204 may be used to analyze a spectrogram 202, or a series of displaced (optionally overlapping) analysis windows 204 may be used.

Vectors 206 may be data sets containing interim and/or final results from analysis of audio stream 200 and/or corresponding spectrogram 202.

Time indices 208 may indicate times, within audio stream 200 (and/or the audiovisual stream from which audio stream 200 is extracted) at which key audio events occur. For example, time indices 208 may be the times, within the audiovisual content, at which the audio events begin, are centered, or end. Thus, time indices 208 may indicate the beginnings or ends of particularly interesting parts of the audiovisual stream, such as, in the context of a sporting event, important or impressive plays, or plays that may be of particular interest to a particular user 150.

As further shown, user data 155 may include records pertaining to users 150, each of which may include demographic data 212, preferences 214, viewing history 216, and purchase history 218 for a particular user 150.

Demographic data 212 may include any type of demographic data, including but not limited to age, gender, location, nationality, religious affiliation, education level, and/or the like.

Preferences 214 may include selections made by user 150 regarding his or her preferences. Preferences 214 may relate directly to highlight and metadata gathering and/or viewing, or may be more general in nature. In either case, preferences 214 may be used to facilitate identification and/or presentation of the highlights and metadata to user 150.

Viewing history 216 may list television programs, audiovisual streams, highlights, web pages, search queries, sporting events, and/or other content retrieved and/or viewed by user 150.

Purchase history 218 may list products or services purchased or requested by user 150.

As further shown, highlight data 164 may include records for j highlights 220, each of which may include an audiovisual stream 222 and/or metadata 224 for a particular highlight 220.

Audiovisual stream 222 may include audio and/or video depicting highlight 220, which may be obtained from one or more audiovisual streams of one or more events (for example, by cropping the audiovisual stream to include only audiovisual stream 222 pertaining to highlight 220). Within metadata 224, identifier 223 may include time indices (such as time indices 208 of audio data 154) and/or other indicia that indicate where highlight 220 resides within the audiovisual stream of the event from which it is obtained.

In some embodiments, the record for each of highlights 220 may contain only one of audiovisual stream 222 and identifier 223. Highlight playback may be carried out by playing audiovisual stream 222 for user 150, or by using identifier 223 to play only the highlighted portion of the audiovisual stream for the event from which highlight 220 is obtained. Storage of identifier 223 is optional; in some embodiments, identifier 223 may only be used to extract audiovisual stream 222 for highlight 220, which may then be stored in place of identifier 223. In either case, time indices 208 for highlight 220 may be extracted from audio data 154 and stored, at least temporarily, as metadata 224 that is either appended to highlight 220, or to the audiovisual stream from which audio data 154 and highlight 220 are obtained. In some embodiments, time indices 208 may be stored as boundaries 232 of identifier 223.

In addition to or in the alternative to identifier 223, metadata 224 may include information about highlight 220, such as the event date, season, and groups or individuals involved in the event or the audiovisual stream from which highlight 220 was obtained, such as teams, players, coaches, anchors, broadcasters, and fans, and/or the like. Among other information, metadata 224 for each highlight 220 may include a phase 226, clock 227, score 228, a frame number 229, and/or an excitement level 230.

Phase 226 may be the phase of the event pertaining to highlight 220. More particularly, phase 226 may be the stage of a sporting event in which the start, middle, and/or end of highlight 220 resides. For example, phase 226 may be "third quarter," "second inning," "bottom half," or the like.

Clock 227 may be the game clock pertaining to highlight 220. More particularly, clock 227 may be the state of the game clock at the start, middle, and/or end of highlight 220. For example, clock 227 may be "15:47" for a highlight 220 that begins, ends, or straddles the period of a sporting event at which fifteen minutes and forty-seven seconds are displayed on the game clock.

Score 228 may be the game score pertaining to highlight 220. More particularly, score 228 may be the score at the beginning, end, and/or middle of highlight 220. For example, score 228 may be "45-38," "7-0," "30-love," or the like.

Frame number 229 may be the number of the video frame, within the audiovisual stream from which highlight 220 is obtained, or audiovisual stream 222 pertaining to highlight 220, that relates to the start, middle, and/or end of highlight 220.

Excitement level 230 may be a measure of how exciting or interesting an event or highlight is expected to be for a particular user 150, or for users in general. In at least one embodiment, excitement level 230 may be computed as indicated in the above-referenced related applications. Additionally, or alternatively, excitement level 230 may be determined, at least in part, by analysis of audio data 154, which may be a component that is extracted from audiovisual stream 222 and/or audio stream 200. For example, audio data 154 that contains higher levels of crowd noise, announcements, and/or up-tempo music may be indicative of a high excitement level 230 for associated highlight 220. Excitement level 230 need not be static for a highlight 220, but may instead change over the course of highlight 220. Thus, system 100 may be able to further refine highlights 220 to show a user only portions that are above a threshold excitement level 230.

The data structures set forth in FIG. 2 are merely exemplary. Those of skill in the art will recognize that some of the data of FIG. 2 may be omitted or replaced with other data in the performance of highlight identification and/or metadata extraction. Additionally, or alternatively, data not specifically shown in FIG. 2 or described in this application may be used in the performance of highlight identification and/or metadata extraction.

Analysis of Audio Data

In at least one embodiment, the system performs several stages of analysis of audio data 154 in both the time and time-frequency domains, so as to detect bursts of energy (i.e., audio volume) due to occurrences during an audiovisual program, such as a broadcast of a sporting event. One example of such a burst of high-energy audio is a tennis ball hit during the delivery of a tennis serve.

First, a compressed audio signal may be read, decoded, and resampled to a desired sampling rate. Next, a resulting PCM audio signal may be pre-filtered for noise reduction, click removal, and/or audience noise reduction, using any of a number of interchangeable digital filtering stages.

Subsequently, time-domain analysis may be performed on the audio data 154, followed by time-frequency spectrogram generation and a joined time-frequency analysis. Audio event detection may be performed in successive stages, with time-domain detection results fed into the spectral neighborhood analysis. Detection of distinct spectral spread in time-frequency at time positions obtained by time-domain analysis may be applied to reduce false positive detections generated by strong audio energy peaking due to audience noise such as clapping and cheering. Finally, two-level filtering with back adjustments of time intervals between desired audio event detections may be applied to an event vector to obtain a final desired audio event timeline for the entire sporting event.

Time indices 208 before and/or after the high-energy audio bursts may be used as boundaries 232 (for example, beginnings or ends) of highlights 220. In some embodiments, these time indices 208 may be used to identify the actual beginning and/or ending points of highlights 220 that have already been identified (for example, with tentative boundaries 232 which may be tentative beginning and ending points that can subsequently be adjusted based on identification of audio events). Highlights 220 may be extracted and/or identified, within the video stream, for subsequent viewing by the user.

Figure 3A:
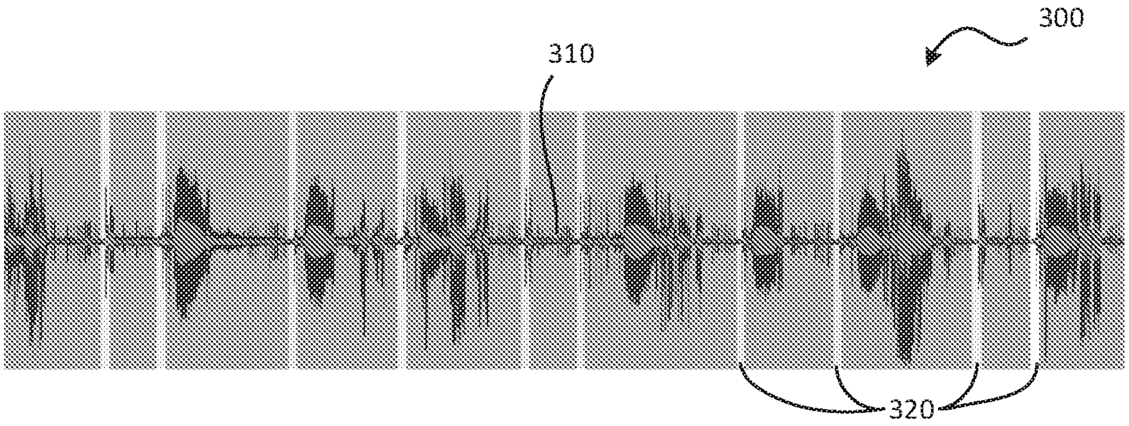
FIG. 3A depicts an example of an audio waveform graph showing exemplary occurrences of high-energy audio events (e.g., tennis serves) in an audio signal extracted from sporting event television programming content in a time domain, according to one embodiment.

FIG. 3A depicts an example of an audio waveform graph 300 in an audio stream 310 extracted from sporting event television programming content in a time domain, according to one embodiment. Highlighted areas show exemplary audio events 320 of high intensity, such as, for example, tennis ball hits from serves in a tennis match. The amplitude of captured audio may be relatively high and of short duration in the audio events 320, representing relatively high-energy audio bursts within audio stream 310.

Figure 3B:
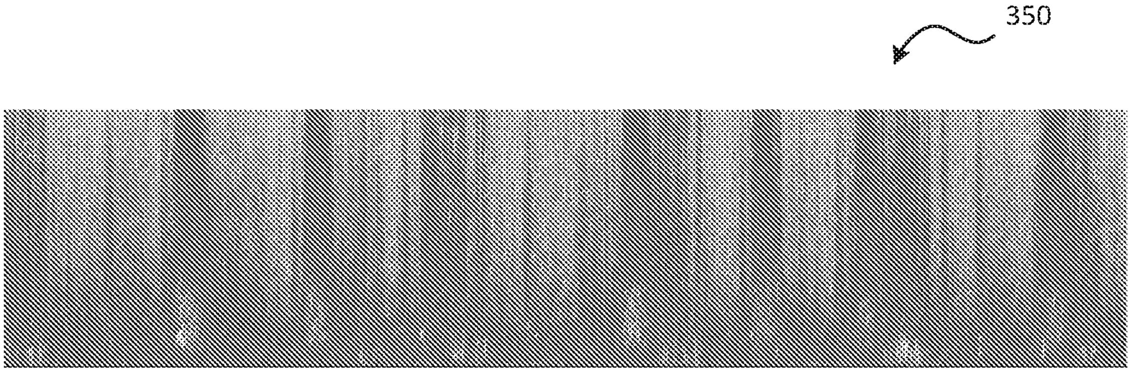
FIG. 3B depicts an example of a spectrogram corresponding to the audio waveform graph of FIG. 3A, in a time-frequency domain, according to one embodiment.

FIG. 3B depicts an example of a spectrogram 350 corresponding to audio waveform graph 300 of FIG. 3A, in a time-frequency domain, according to one embodiment. In at least one embodiment, detecting and marking of audio events 320 is performed in the time-frequency domain, and boundaries 232 for highlight generation (not shown in FIGS. 3A and 3B) are presented in real-time to the video highlights and metadata generation application. These boundaries 232 may be used to extract one or more highlights 220 from the video stream, or to determine, with greater accuracy, the beginning and/or ending of each highlight 220 within the video stream so that highlight 220 can be played without inadvertently playing other content representing portions of the video stream that are not part of the highlight. Boundaries 232 may be used, for example, to locate the beginning of a highlight closer to reduce abruptness in transitions from one highlight 220 to another, by helping in determining appropriate transition points in the content, such as at the end of sentences or during pauses in the audio. In some embodiments, boundaries 232 may be incorporated into metadata 224, such as in identifiers 223 that identify the beginning and/or end of a highlight 220, as set forth in the description of FIG. 2.

Audio Data Analysis and Metadata Extraction

Figure 4:
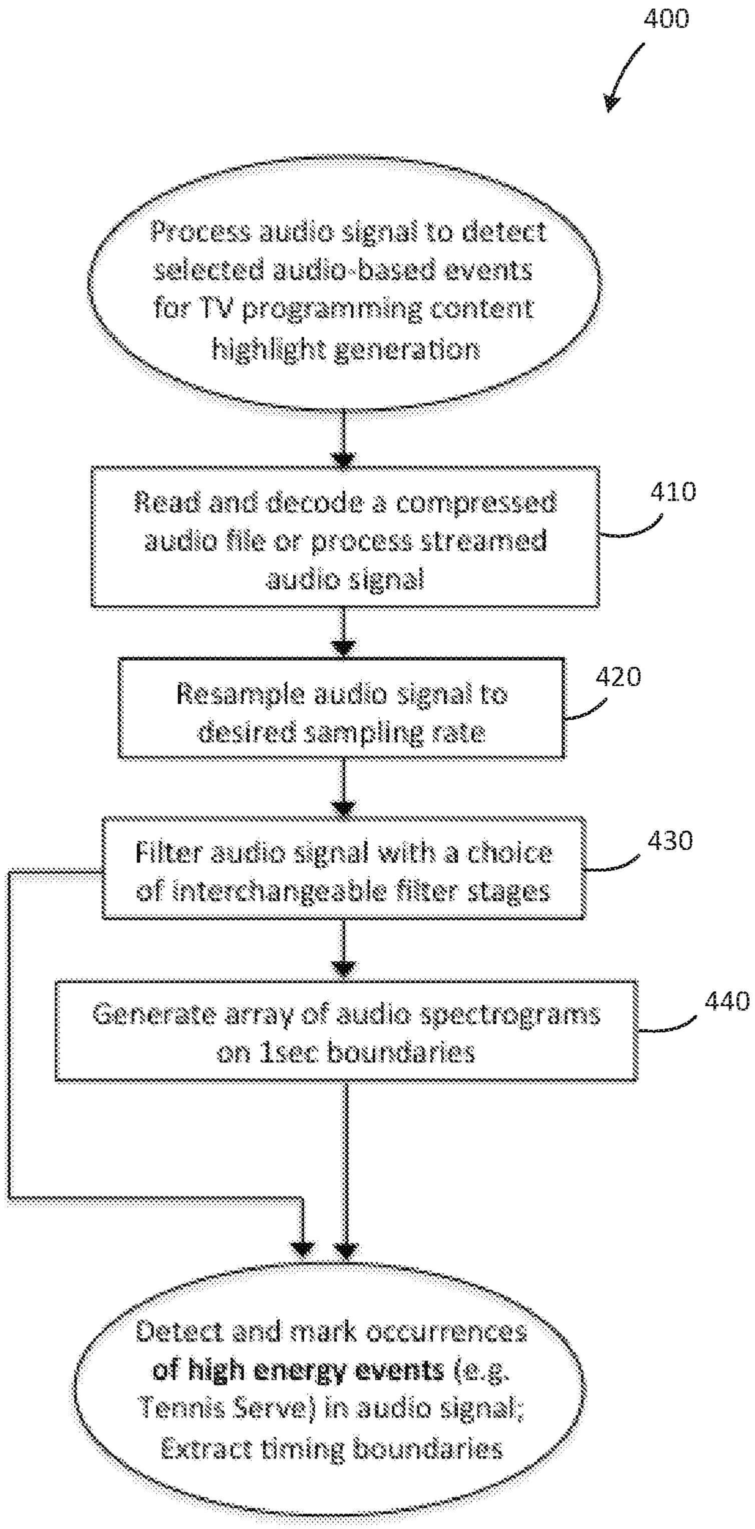
FIG. 4 is a flowchart depicting a method for pre-processing an audio signal in preparation for identifying boundaries for television programming content highlight generation, according to one embodiment.

FIG. 4 is a flowchart depicting a method 400 for preprocessing of an audio stream 310 in preparation for identifying boundaries 232 for television programming content highlight generation, according to one embodiment. In at least one embodiment, method 400 may be carried out by an application (for example, running on one of client devices 106 and/or analytical servers 116) that receives audio stream 310 and performs on-the-fly processing of audio data 154 for identification of audio events 320, for example, to ascertain boundaries 232 of highlights 220, according to one embodiment. According to method 400, audio data 154 such as audio stream 310 may be processed to detect audio events 320 in audio data 154 by detecting short, high-energy audio bursts in audio, video, and/or audiovisual programming content.

In at least one embodiment, method 400 (and/or other methods described herein) is performed on audio data 154 that has been extracted from audiovisual stream or other audiovisual content. Alternatively, the techniques described herein can be applied to other types of source content. For example, audio data 154 need not be extracted from an audiovisual stream; rather it may be a radio broadcast or other audio depiction of a sporting event or other event.

In at least one embodiment, method 400 (and/or other methods described herein) may be performed by a system such as system 100 of FIG. 1A; however, alternative systems, including but not limited to system 160 of FIG. 1B, system 180 of FIG. 1C, and system 190 of FIG. 1D, may be used in place of system 100 of FIG. 1A. Further, the following description assumes that audio events 320 of high intensity are to be identified; however, it will be understood that different types of audio events 320 may be identified and used to extract metadata and/or identify boundaries 232 of highlights 220 according to methods similar to those described herein.

Method 400 of FIG. 4 may commence with a step 410 in which audio data 154, such as an audio stream 200, is read; if audio data 154 is in a compressed format, it can optionally be decoded. In a step 420, audio data 154 may be resampled to a desired sampling rate.

In a step 430, audio data 154 may be filtered using any of a number of interchangeable digital filtering stages. Digital filtering of decoded audio data 154 may be different for time-domain analysis as compared to digital filtering for the frequency-domain analysis; accordingly, in at least one embodiment, two lines of filter stages are formed and the results are routed to two independent PCM buffers, one for each domain of processing.

Next, in a step 440, an array of spectrograms 202 may be generated for the filtered audio data 154, for example by computing a Short-time Fourier Transform (STFT) on one-second chunks of the filtered audio data 154. Time-frequency coefficients each for spectrogram 202 may be saved in a two-dimensional array for further processing.

In some embodiments, when the desired audio events 320 can be identified without spectral content, step 440 may be omitted, and further analysis may be simplified by performing such analysis on time-domain audio data 154 only. However, in such a case, undesirable audio event 320 detections may occur due to inherently unreliable indicators based on thresholding of audio volume only, without consideration of spectral content pertinent to particular sounds of interest such as a commentator's voice and/or background audience noise; such sounds may be of low volume in the time domain but may have rich spectral content in the time-frequency domain. Thus, as described below, it can be beneficial to perform analysis of the audio stream in both the time domain and time-frequency domain, with subsequent consolidation of detected audio events into a final result.

Accordingly, in further descriptions in connection with FIGS. 5 through 8 below, it is assumed that step 440 has been carried out, and that the audio analysis steps are performed on audio data 154 in the time domain, and on spectrogram 202 corresponding to audio data 154 in the frequency domain (for example, after decoding, resampling, and/or filtering audio data 154 as described above). The final vector of audio events in the audio stream may be formed with a focus on, but is not necessarily limited to, detection of high intensity, low duration audio events 320 in audio data 154, which may pertain to exciting occurrences within highlights, such as the sound of a tennis racket striking a tennis ball.

Figure 5:
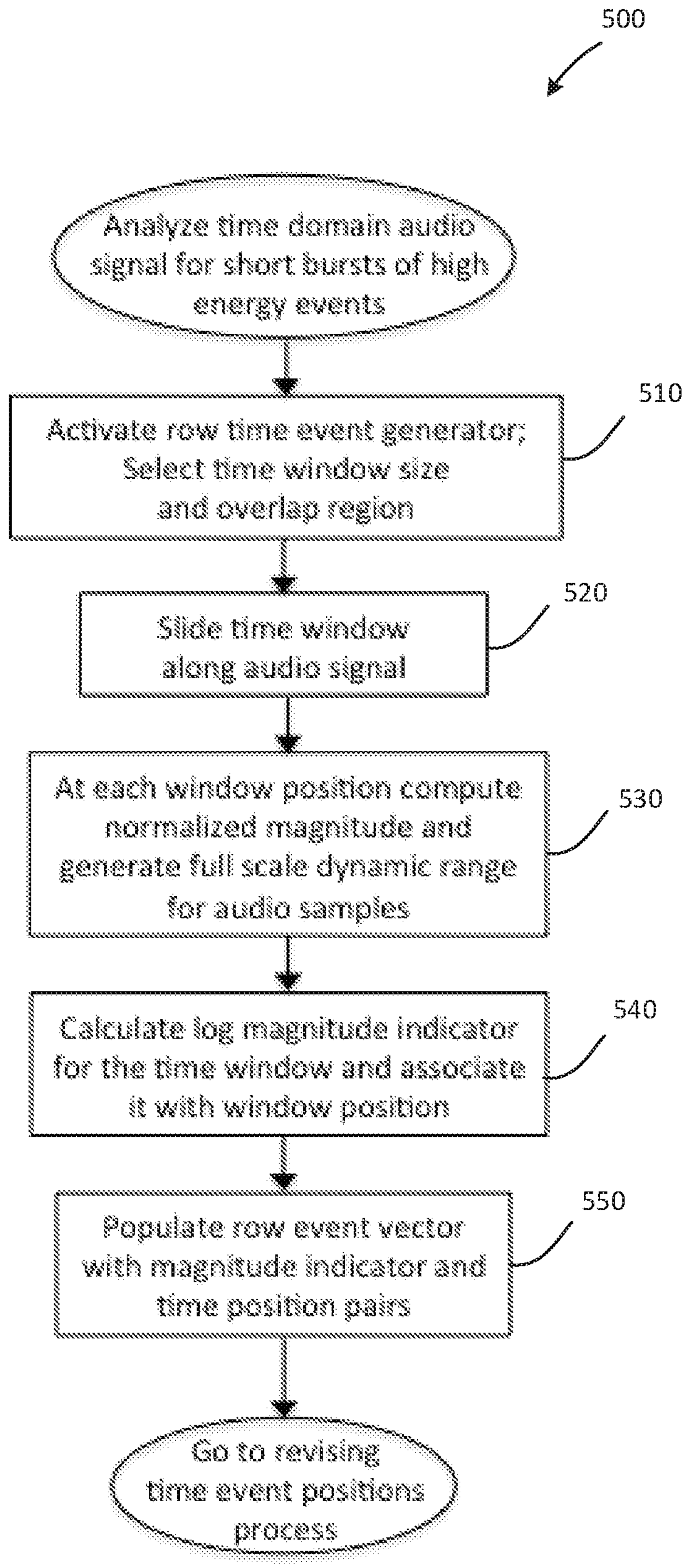
FIG. 5 is a flowchart depicting a method for analyzing audio data, such as an audio stream, in the time domain to detect audio events, according to one embodiment.

FIG. 5 is a flowchart depicting a method 500 for analyzing audio data 154, such as audio stream 200, in the time domain to detect the audio events 320, according to one embodiment. First, in a step 510, an analysis window size and overlap region size may be selected. In some embodiments, a time analysis window 204 of size T is selected, where T is a time span value (for example, ~100 ms). A window overlap region N may exist between adjacent analysis windows 204, and window sliding step S=(T−N) may be computed (typically ~20 msec).

The method 500 may proceed to a step 520 in which analysis window 204 slides along the audio data 154 in successive steps S along time axes of the audio data 154. In a step 530, at each position of analysis window 204, a normalized magnitude for audio samples is computed. The normalized magnitudes may be expanded to a full-scale dynamic range. In a step 540, an average sample magnitude is calculated for the analysis window, and a log magnitude indicator is generated at each window position. In a step 550, a time event vector may be populated with detected time-domain audio events described by pairs of magnitude-indicator and associated time-position. This time-domain event vector may subsequently be used in an audio event evaluation/revision process invoking audio signal spectral characteristics in the neighborhood of detected audio events.

As mentioned previously, in some embodiments, a spectrogram 202 is constructed for the analyzed audio data 154. In at least one embodiment, 2-D diamond-shaped time-frequency area filtering may be performed to extract pronounced spectral magnitude peaks. A spectral event vector may be populated with magnitude and time-frequency coordinates for each selected peak. Furthermore, a spectrogram time spread range may be constructed around audio event time positions obtained in the above-described time-domain analysis, and selected spectrogram magnitude peaks in this time spread range may be counted and recorded. In this manner, a qualifier may be established for each point in the time-domain events vector. Only audio event time positions with the qualifier below a certain threshold may be accepted as viable audio event points.

Figure 6:
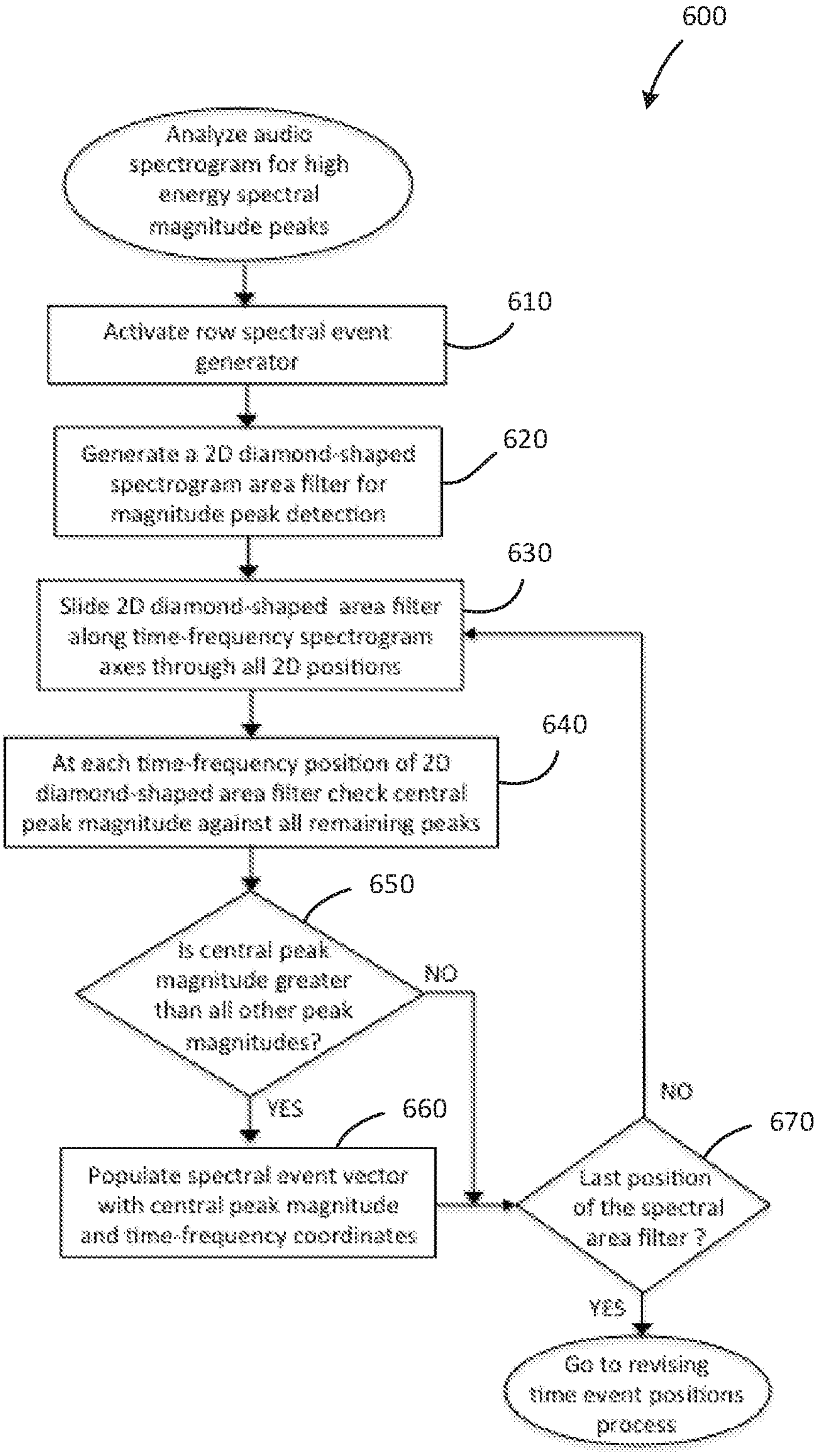
FIG. 6 is a flowchart depicting a method for analyzing an audio spectrogram for high-energy spectral magnitude peaks, according to one embodiment.

FIG. 6 is a flowchart depicting a method 600 for analyzing spectrogram 202 for high-energy spectral magnitude peaks, according to one embodiment. In a step 610, a row spectral event generator may be activated. In a step 620, a 2-D diamond-shaped spectrogram area filter ("area filter") for pronounced time-frequency magnitude peak selection may be generated. In a step 630, the area filter may be advanced along time and frequency spectrogram axes through all 2D positions. In a step 640, at each time-frequency position, central peak magnitudes may be checked against all remaining peak magnitudes within the area filter. A query 650 may determine whether the central peak magnitude is greater than all other peak magnitudes. In a step 660, all dominating area filter central peaks having maximum magnitude with respect to all remaining area filter peaks may be retained, and a spectral event vector may be populated with their respective magnitudes and time-frequency coordinates. A query 670 determines whether the time-frequency position of the 2-D diamond-shaped area filter is the last position in the spectrogram 202. If not, the method 600 may return to the step 630 and advance the area filter to the next position in the spectrogram 202.

Figure 7:
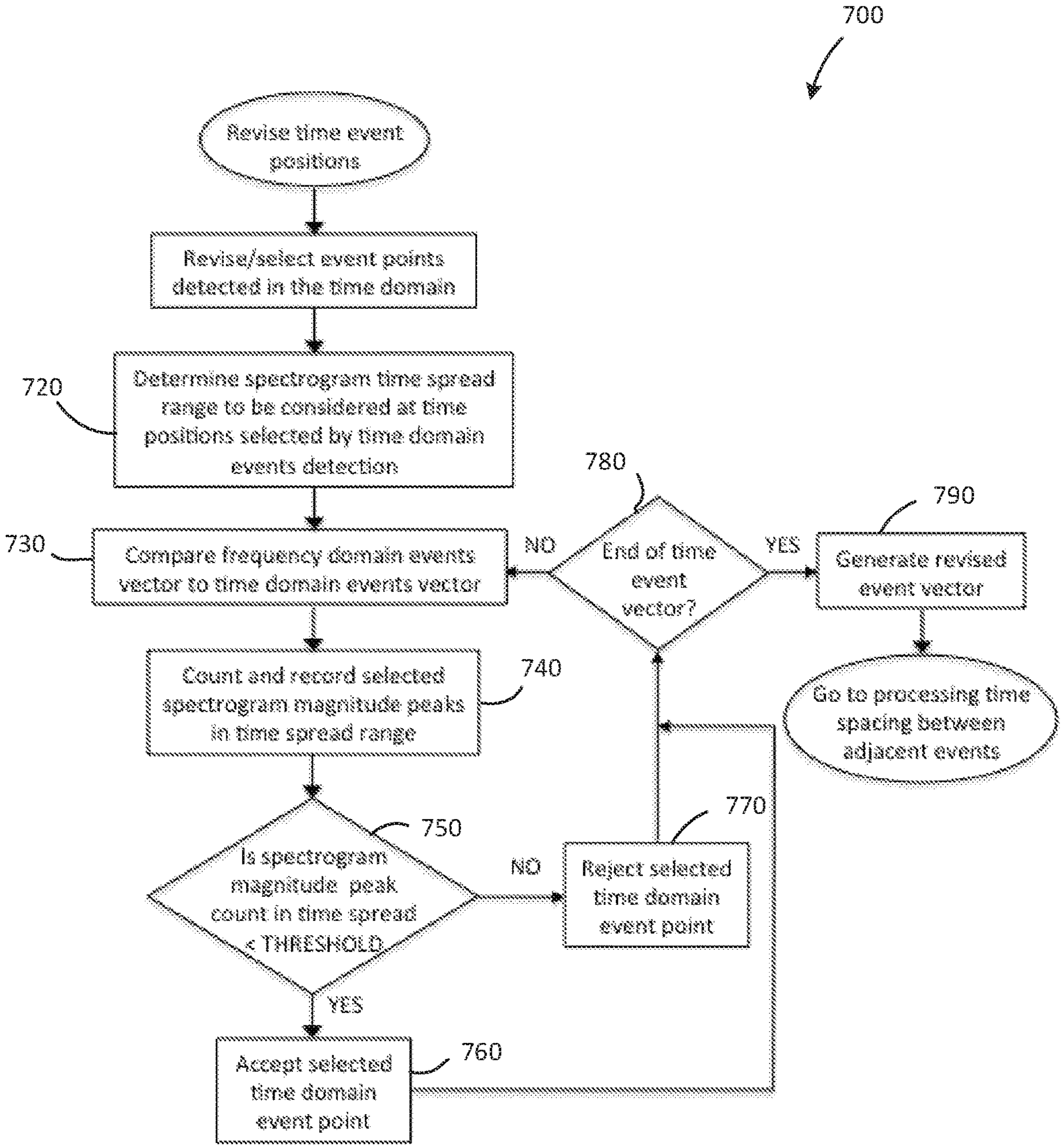
FIG. 7 is a flowchart depicting a method for joint analysis of audio events detected in the time domain and spectral event vector elements obtained by analysis of a spectrogram, according to one embodiment.

Once all positions of the 2D diamond-shaped area filter have been analyzed, the method 600 may end, and further processing may be taken in subsequent methods (for example, the method 700 of FIG. 7). In such further processing steps, time-domain generated audio events may be revised based on a qualifier computed by considering the density of spectral event vector elements at neighborhoods of the time-domain generated audio events.

FIG. 7 is a flowchart depicting a method 700 for joint analysis of audio events detected in the time domain and the spectral event vector elements obtained by analysis of spectrogram 202, according to one embodiment. Pursuant to method 700, audio event points detected in the time domain may be revised and/or selected for further analysis. In a step 720, a spectrogram time spread range around selected time-domain audio events may be determined. In a step 730, the frequency-domain events vector generated by method 600 may be compared with the time-domain events vector generated by method 500.

In a step 740, spectral event vector elements positioned in the spectrogram time spread range around selected time-domain audio events may be counted and recorded as qualifiers for each audio event. In a query 750, the qualifier associated with each time-domain audio event may be compared against a threshold. In a step 760, all audio events with a qualifier below the threshold may be accepted. Conversely, in a step 770, all audio events with a qualifier above the threshold may be suppressed. Step 770 may remove most of the dense bursts of high-energy audio events with pronounced spectral peaks extending over the entire spectrogram time spread, thus reducing the incidence of false detection of the desired occurrence. For example, step 770 may reduce the likelihood of false tennis serve detection due to audience clapping, chanting, loud music, etc.

In a query 780, method 700 may determine whether the end of the time event vector has been reached. If not, method 700 may return to step 730 and advance to the next position in the time event vector. If the end of the time event vector has been reached, method 700 may proceed to a step 790 in which a qualifier revised event vector is generated. Processing may then proceed to further audio event selection in accordance to a desired audio event spacing schedule, as will be set forth in method 800 of FIG. 8, as described below.

In at least one embodiment, this further processing of the qualified events vector removes audio events in close proximity to one another that may be redundant and undesirable. In the exemplary case of tennis games, these redundant audio events may be due to a series of densely spaced tennis ball bounces before a serve is delivered. Hence, the qualified audio events may be subjected to a schedule of minimal allowed time distances between consecutive audio events. Thus, method 800 of FIG. 8 may optionally be used to suppress undesirable, redundant detections.

Figure 8:
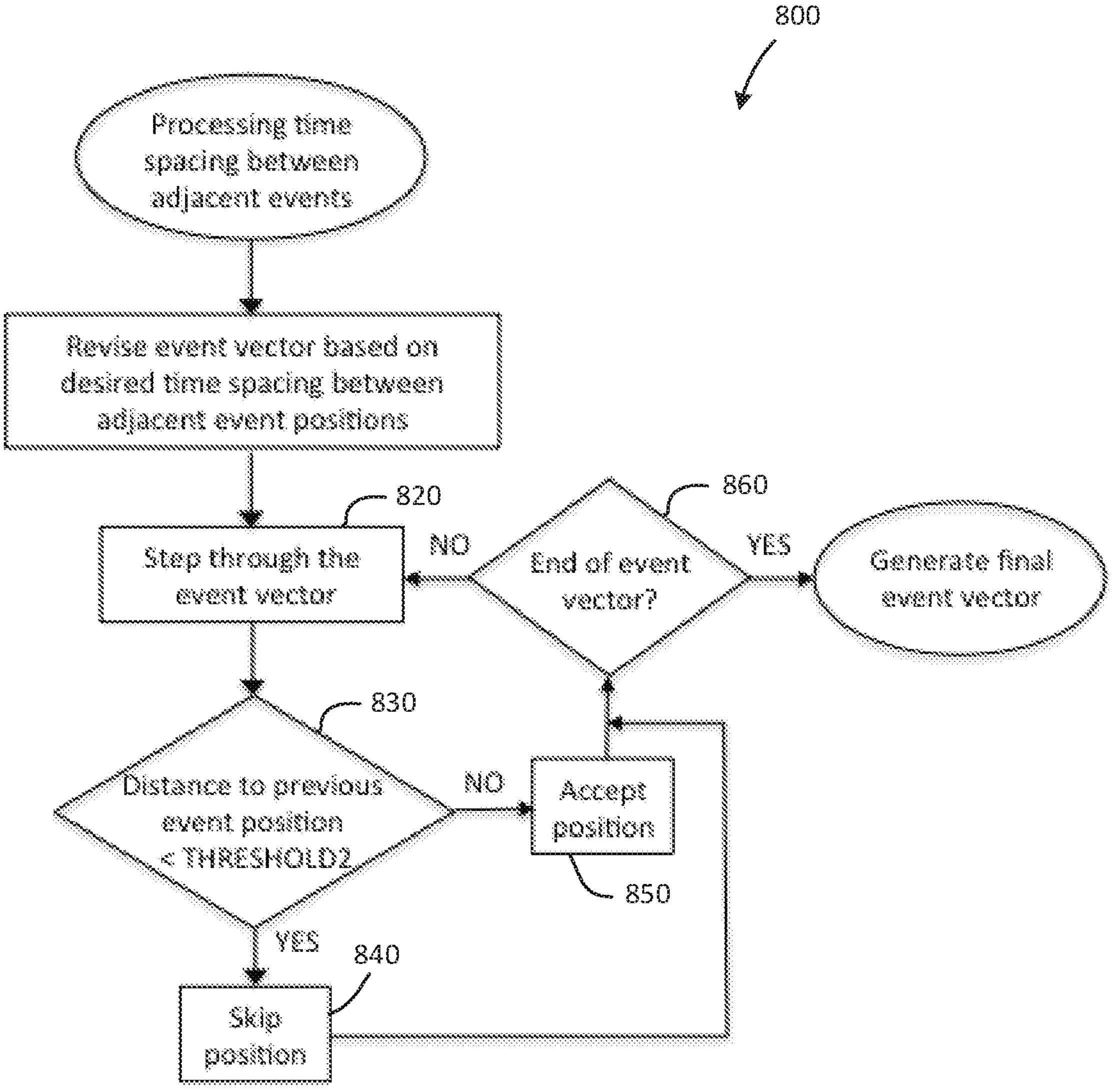
FIG. 8 is a flowchart depicting a method for further selection of desired audio events via removal of event vector elements spaced below a minimum time distance between consecutive audio events, according to one embodiment.

FIG. 8 is a flowchart depicting a method 800 for further selection of desired audio events via removal of event vector elements spaced below a minimum time distance between consecutive audio events, according to one embodiment. In a step 820, the system may step through the event vector elements one at a time. In a query 830, the time distance to the previous audio event position may be tested. In a step 840, if this time distance is below a threshold, that position may be skipped. Conversely, in a step 850, if this time distance is not below the threshold, that position may be accepted. In either case, method 800 may proceed to a query 860 that determines whether the end of the event vector has been reached. If not, the system may proceed to the next event vector element. Method 800 may be repeated as desired with adjusted time distance thresholding.

The event vector post-processing steps as described above may be performed in any desired order. The depicted steps can be performed in any combination with one another, and some steps can be omitted. At the end of the process (i.e., when the end of the event vector has been reached), a new final event vector may be generated containing a desired audio event timeline for the game. Optionally, the audio events may further be elaborated on with crowd noise detection, announcer voice recognition, and the like in order to further refine identification of the audio events.

In at least one embodiment, the automated video highlights and associated metadata generation application receives a live broadcast program, or a digital audiovisual stream via a computer server, and processes audio data 154 using digital signal processing techniques so as to detect high-energy audio associated with, for example, tennis ball hits and related tennis serve delivery in tennis games, as described above. These audio events may be sorted and selected using the techniques described herein. Extracted information may then be appended to metadata 224 associated with an event, such as a sporting event. Metadata 224 may be associated with the event television programming video highlights, and can be used, for example, to determine boundaries 232 (i.e., start and/or end times) for segments used in highlight generation.

For example, the start of a highlight may be established ten seconds prior to an audio event identified as a tennis serve. Similarly, the end of the highlight may be established ten seconds prior to the next audio event identified as a tennis serve. Thus, one volley of the game may be isolated in a highlight. Of course, boundaries 232 may be identified in many other ways through the techniques used to analyze audio data 154, as presented herein.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment", or to "an embodiment", means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may be more convenient to construct specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Washington; Mac OS X, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method of selecting an audio event within an audio data to be included in a highlight of the audio data, the method comprising:

analyzing, by a computer in a time domain, an audio data to detect a high energy audio burst corresponding to an audio event within the audio data;

determining, by the computer, an event time position within the audio data of the audio event;

analyzing, by the computer in a frequency domain, a portion of the audio data within a time spread range containing the event time position to generate a spectral distribution of audio in the time spread range, wherein the analyzing includes filtering a spectrogram of the portion of the audio data within the time spread range by extracting, using a two-dimensional diamond-shaped spectrogram area filter, a subset of spectral peaks that form the spectral distribution of the audio in the time spread range;

determining, by the computer, the number of peaks in the spectral distribution of audio in the time spread range; and in response to the computer determining that a number of peaks is below a threshold, adding, by the computer, the audio event in a highlight of the audio data.

2. The method of claim 1, wherein the filtering comprises:

sliding, by the computer, the two-dimensional diamond-shaped spectrogram area filter along time and frequency axes of the spectrogram to a first position;

determining, by the computer at the first position of the two-dimensional diamond-shaped spectrogram area filter, whether a central spectral peak magnitude is greater than remaining spectral peak magnitudes; and in response to the computer determining that the central spectral peak magnitude is greater than the remaining spectral peak magnitudes for the first position of the two-dimensional diamond-shaped spectrogram area filter:

adding, by the computer, the central spectral peak in the subset of the spectral peaks that form the spectral distribution of the audio in the time spread range.

3. The method of claim 1, wherein analyzing, in the frequency domain, the portion of the audio data within the time spread range comprises:

analyzing, by the computer, the portion of the audio data within the time spread range in a joint time-frequency domain.

4. The method of claim 1, wherein analyzing the audio data in the time domain further comprises:

selecting, by the computer, an analysis time window;

sliding, by the computer, the analysis time window along the audio data;

computing, by the computer, normalized magnitudes of audio samples at each position of the analysis time window; and detecting, by the computer, the high energy audio burst based on the computed normalized magnitudes of the audio samples.

5. The method of claim 1, further comprising:

preprocessing, by the computer, the audio data prior to analyzing the audio data in the time domain, by resampling the audio data to a predetermined sampling rate.

6. The method of claim 1, further comprising:

preprocessing, by the computer, the audio data prior to analyzing the audio data in the time domain, by filtering the audio data to be within a predetermined spectral band.

7. The method of claim 1, wherein the audio data comprises audio from a sports broadcast.

8. The method of claim 7, wherein the sports comprises tennis, and wherein the event comprises a tennis serve.

9. A system for selecting an audio event within an audio data to be included in a highlight of the audio data, the system comprising:

at least one processor; and a computer-readable non-transitory storage medium storing computer program instructions that when executed by the at least one processor cause the system to perform operations comprising:

analyzing, in a time domain, an audio data to detect a high energy audio burst corresponding to an audio event within the audio data;

determining an event time position within the audio data of the audio event;

analyzing, in a frequency domain, a portion of the audio data within a time spread range containing the event time position to generate a spectral distribution of audio in the time spread range, wherein the analyzing includes filtering a spectrogram of the portion of the audio data within the time spread range by extracting, using a two-dimensional diamond-shaped spectrogram area filter, a subset of spectral peaks that form the spectral distribution of the audio in the time spread range;

determining the number of peaks in the spectral distribution of audio in the time spread range; and in response to the determining that a number of peaks is below a threshold, adding the audio event in a highlight of the audio data.

10. The system of claim 9, wherein the filtering comprises:

sliding the two-dimensional diamond-shaped spectrogram area filter along time and frequency axes of the spectrogram to a first position;

determining, at the first position of the two-dimensional diamond-shaped spectrogram area filter, whether a central spectral peak magnitude is greater than remaining spectral peak magnitudes; and in response to determining that the central spectral peak magnitude is greater than the remaining spectral peak magnitudes for the first position of the two-dimensional diamond-shaped spectrogram area filter:

adding the central spectral peak in the subset of the spectral peaks that form the spectral distribution of the audio in the time spread range.

11. The system of claim 9, wherein analyzing, in the frequency domain, the portion of the audio data within the time spread range comprises:

analyzing the portion of the audio data within the time spread range in a joint time-frequency domain.

12. The system of claim 9, wherein analyzing the audio data in the time domain further comprises:

selecting an analysis time window;

sliding the analysis time window along the audio data;

computing normalized magnitudes of audio samples at each position of the analysis time window; and detecting the high energy audio burst based on the computed normalized magnitudes of the audio samples.

13. The system of claim 9, the operations further comprising:

preprocessing the audio data prior to analyzing the audio data in the time domain by resampling the audio data to a predetermined sampling rate.

14. The system of claim 9, the operations further comprising:

preprocessing the audio data prior to analyzing the audio data in the time domain by filtering the audio data to be within a predetermined spectral band.

15. A non-transitory computer-readable medium storing computer program instructions that when executed cause operations comprising:

analyzing, in a time domain, an audio data to detect a high energy audio burst corresponding to an audio event within the audio data;

determining an event time position within the audio data of the audio event;

analyzing, in a frequency domain, a portion of the audio data within a time spread range containing the event time position to generate a spectral distribution of audio in the time spread range, wherein the analyzing includes filtering a spectrogram of the portion of the audio data within the time spread range by extracting, using a two-dimensional diamond-shaped spectrogram area filter, a subset of spectral peaks that form the spectral distribution of the audio in the time spread range;

determining the number of peaks in the spectral distribution of audio in the time spread range; and in response to the determining that a number of peaks is below a threshold, adding the audio event in a highlight of the audio data.

16. The non-transitory computer-readable medium of claim 15, wherein the filtering comprises:

sliding the two-dimensional diamond-shaped spectrogram area filter along time and frequency axes of the spectrogram to a first position;

determining, at the first position of the two-dimensional diamond-shaped spectrogram area filter, whether a central spectral peak magnitude is greater than remaining spectral peak magnitudes; and in response to determining that the central spectral peak magnitude is greater than the remaining spectral peak magnitudes for the first position of the two-dimensional diamond-shaped spectrogram area filter:

adding the central spectral peak in the subset of the spectral peaks that form the spectral distribution of the audio in the time spread range.

17. The non-transitory computer-readable medium of claim 15, wherein analyzing, in the frequency domain, the portion of the audio data within the time spread range comprises:

analyzing the portion of the audio data within the time spread range in a joint time-frequency domain.

* * * * *